United States Patent
Yeon et al.

(10) Patent No.: US 10,574,789 B2
(45) Date of Patent: Feb. 25, 2020

(54) METHOD FOR MANAGING SCHEDULE AND ELECTRONIC DEVICE SUPPORTING THE SAME

(71) Applicant: Samsung Electronics Co., Ltd., Gyeonggi-do (KR)

(72) Inventors: Jihyun Yeon, Gyeonggi-do (KR); Han-Jib Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 209 days.

(21) Appl. No.: 15/641,554

(22) Filed: Jul. 5, 2017

(65) Prior Publication Data

US 2018/0034935 A1 Feb. 1, 2018

(30) Foreign Application Priority Data

Jul. 27, 2016 (KR) .................. 10-2016-0095440

(51) Int. Cl.
*H04L 29/08* (2006.01)
*G06Q 10/06* (2012.01)

(52) U.S. Cl.
CPC ............ *H04L 67/327* (2013.01); *H04L 67/10* (2013.01); *H04L 67/26* (2013.01); *H04L 67/325* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 8,055,707 B2 * | 11/2011 | Desai | G06Q 10/107 709/204 |
| 8,583,086 B2 | 11/2013 | Lim et al. | |
| 9,633,114 B1 * | 4/2017 | Kamangar | G06Q 10/1093 |
| 2007/0037590 A1 | 2/2007 | Lee | |
| 2011/0320973 A1 * | 12/2011 | Yu | G06Q 10/107 715/772 |
| 2014/0189017 A1 * | 7/2014 | Prakash | H04W 4/029 709/206 |
| 2014/0222478 A1 * | 8/2014 | Wang | G06Q 10/06311 705/7.13 |

(Continued)

FOREIGN PATENT DOCUMENTS

| | | |
|---|---|---|
| KR | 10-0701856 B1 | 3/2007 |
| KR | 10-0887374 B1 | 3/2009 |

(Continued)

*Primary Examiner* — Natisha D Cox
(74) *Attorney, Agent, or Firm* — Cha & Reiter, LLC.

(57) ABSTRACT

An electronic device and method are disclosed. The electronic device includes a communication module, a processor and a memory including instructions executable by the processor to implement the method, including detect whether a message is received through the communication module from an external electronic device during a predesignated time as indicated for a registered event stored in a schedule application, in response to determining that the message is received, parsing the received message to detect whether information obtained by the parsing corresponds to the registered event, and in response to detecting that the obtained information corresponds to the registered event, determine that the registered event is completed.

19 Claims, 17 Drawing Sheets

(56) References Cited

U.S. PATENT DOCUMENTS

| | | | |
|---|---|---|---|
| 2014/0244243 A1 | 8/2014 | Kim et al. | |
| 2015/0186829 A1* | 7/2015 | Khan | G06Q 10/06316 705/7.15 |
| 2016/0224939 A1* | 8/2016 | Chen | G06Q 10/107 |
| 2017/0236097 A1* | 8/2017 | Smith | G06Q 10/1095 705/7.19 |

FOREIGN PATENT DOCUMENTS

| | | |
|---|---|---|
| KR | 10-2014-0058026 A | 5/2014 |
| KR | 10-2014-0108374 A | 9/2014 |
| KR | 10-1588730 B1 | 1/2016 |
| KR | 10-2016-0013355 A | 2/2016 |

\* cited by examiner

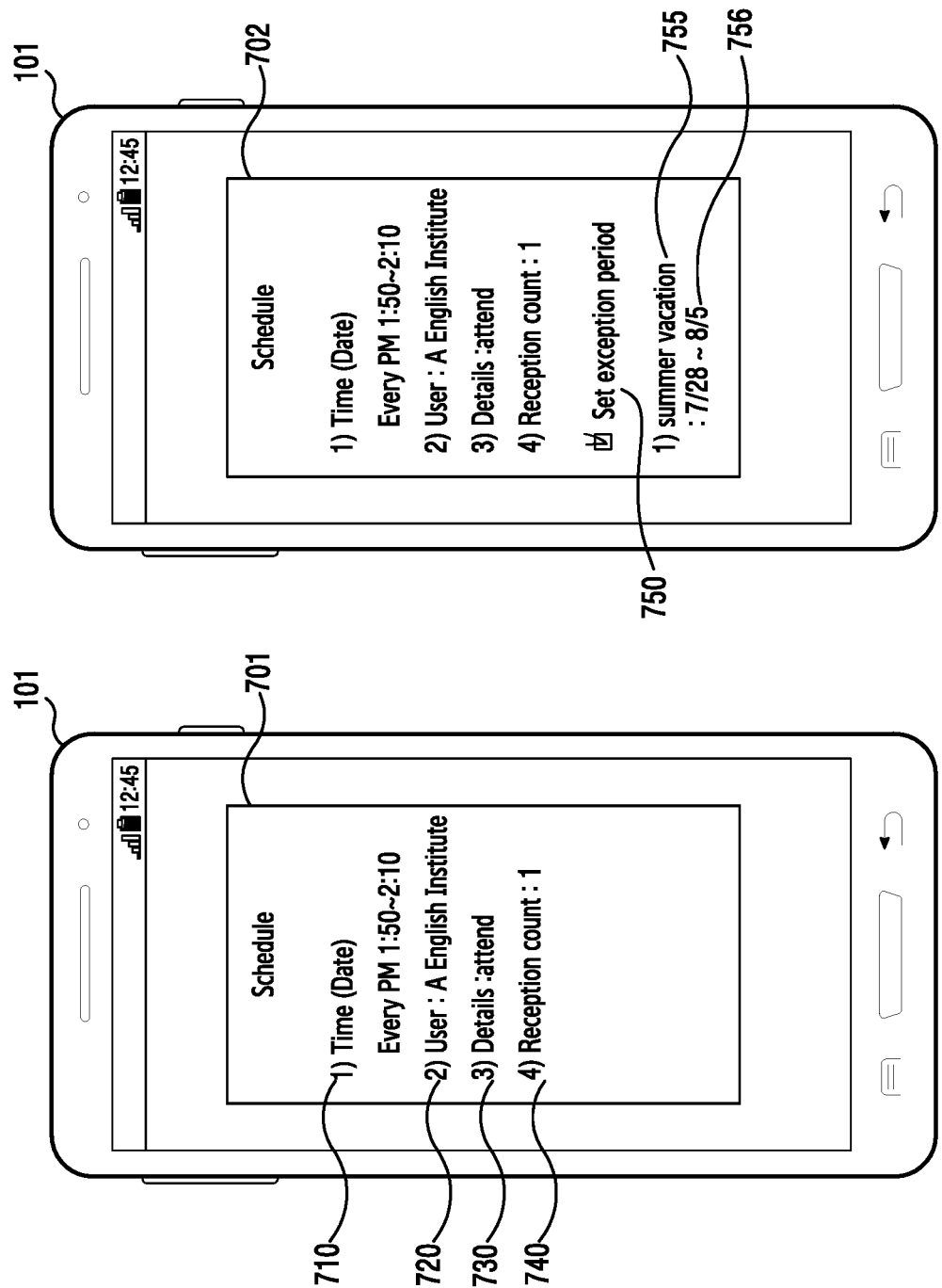

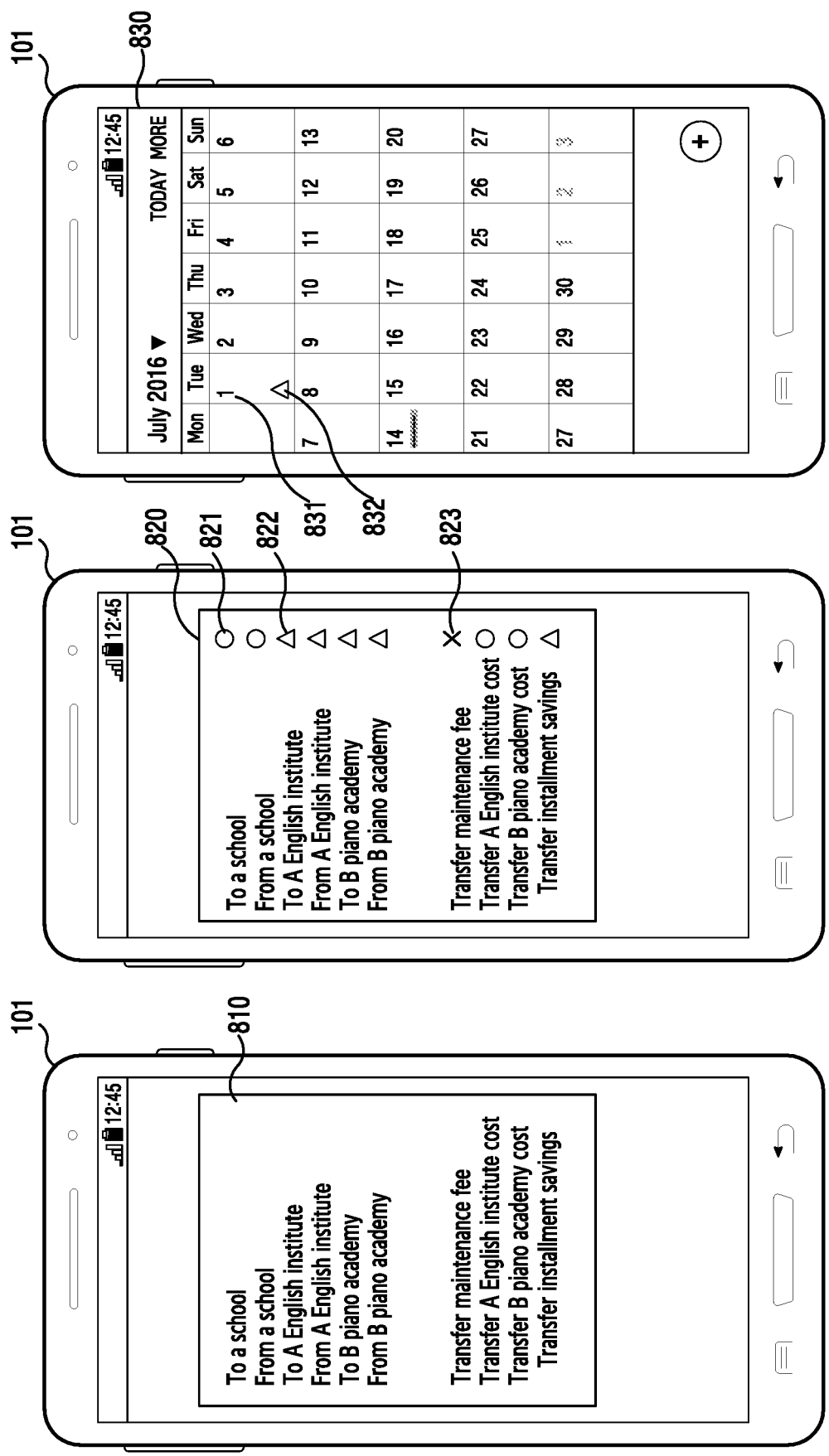

ated Serial No. 10-2016-0095440, the entire disclosure
METHOD FOR MANAGING SCHEDULE AND ELECTRONIC DEVICE SUPPORTING THE SAME

CROSS-REFERENCE TO RELATED APPLICATION

The present application claims the benefit under 35 U.S.C. § 119(a) to a Korean patent application filed in the Korean Intellectual Property Office on Jul. 27, 2016, and assigned Serial No. 10-2016-0095440, the entire disclosure of which is hereby incorporated by reference.

TECHNICAL FIELD

The present disclosure relates generally to a method for managing a schedule and an electronic device supporting the same.

BACKGROUND

An electronic device may send or receive a message to or from another electronic device in various ways. For example, the electronic device can send or receive the message using e-mail, Short Messaging Service (SMS), Multimedia Messaging Service (MMS), Social Network Service (SNS), community-facilitating application, a chatting application, and other assorted messengers. As electronic device users grow in number and the functionality of the electronic device advances, the electronic devices now exchange more messages than ever before.

The electronic device user typically views every message received in various manners (e.g., using different applications), and as a result may accidentally miss some incoming messages.

SUMMARY

To address the above-discussed deficiencies, it is a primary aspect of the present disclosure to provide a method and an electronic device for registering a schedule (e.g., an event being registered to a schedule application) corresponding to an outgoing or incoming message and integrally managing the scheduled event relating to the message.

According to one aspect of the present disclosure, an electronic device is disclosed including a communication module, a processor and a memory including instructions executable by the processor to detect whether a message is received through the communication module from an external electronic device during a predesignated time as indicated for a registered event stored in a schedule application, in response to determining that the message is received, parsing the received message to detect whether information obtained by the parsing corresponds to the registered event, and in response to detecting that the obtained information corresponds to the registered event, determine that the registered even is completed.

According to another aspect of the present disclosure, a method in an electronic device is disclosed including detecting by a processor whether a message is received through a communication module from an external electronic device during a predesignated time as indicated for a registered event stored in a schedule application, in response to determining that the message is received, parsing the received message to detect whether information obtained by the parsing corresponds to the registered event, and in response to detecting that the obtained information corresponds to the registered event, determining that the registered event is completed.

Other aspects and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects and features of certain example embodiments of the present disclosure will be more apparent from the following description taken in conjunction with the accompanying drawings, in which:

FIG. 7A and FIG. 7B are diagrams of schedule registration according to another embodiment of the present disclosure;

FIG. 8A, FIG. 8B, and FIG. 8C are diagrams of schedule registration according to yet another embodiment of the present disclosure;

Throughout the drawings, like reference numerals will be understood to refer to like parts, components and structures.

DETAILED DESCRIPTION

Figure 1:
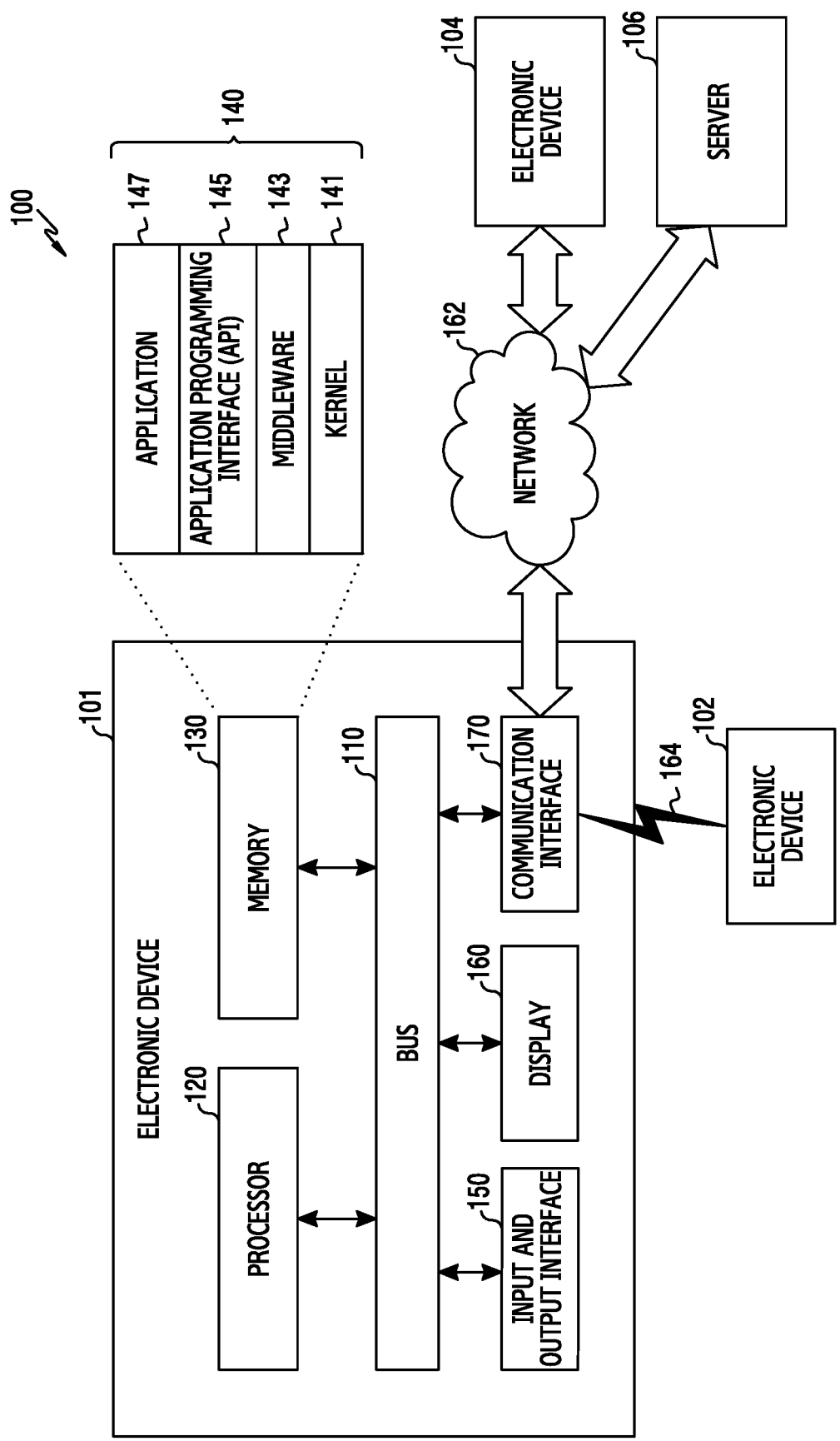
FIG. 1 is a diagram of a network including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™, an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application programs 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
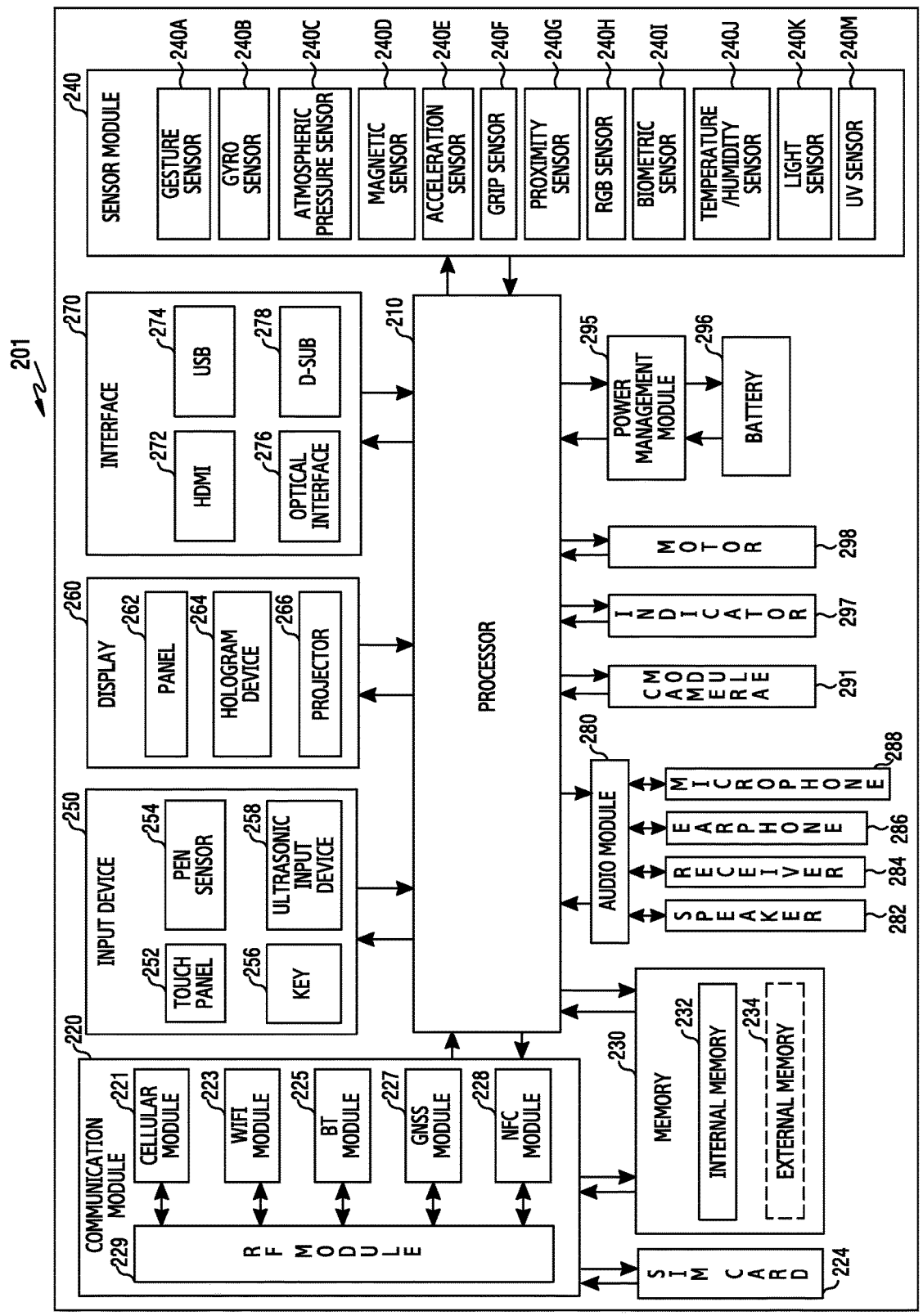
FIG. 2 is a block diagram of an electronic device according to various embodiments of the present disclosure.

FIG. 2 is a block diagram illustrating an electronic device according to various embodiments of the present disclosure.

FIG. 2 is a block diagram of an electronic device 201 according to various embodiments. For example, the electronic device 201 may include the whole or part of the electronic device 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram device 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic device 201 or a part (e.g., the processor 210). The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
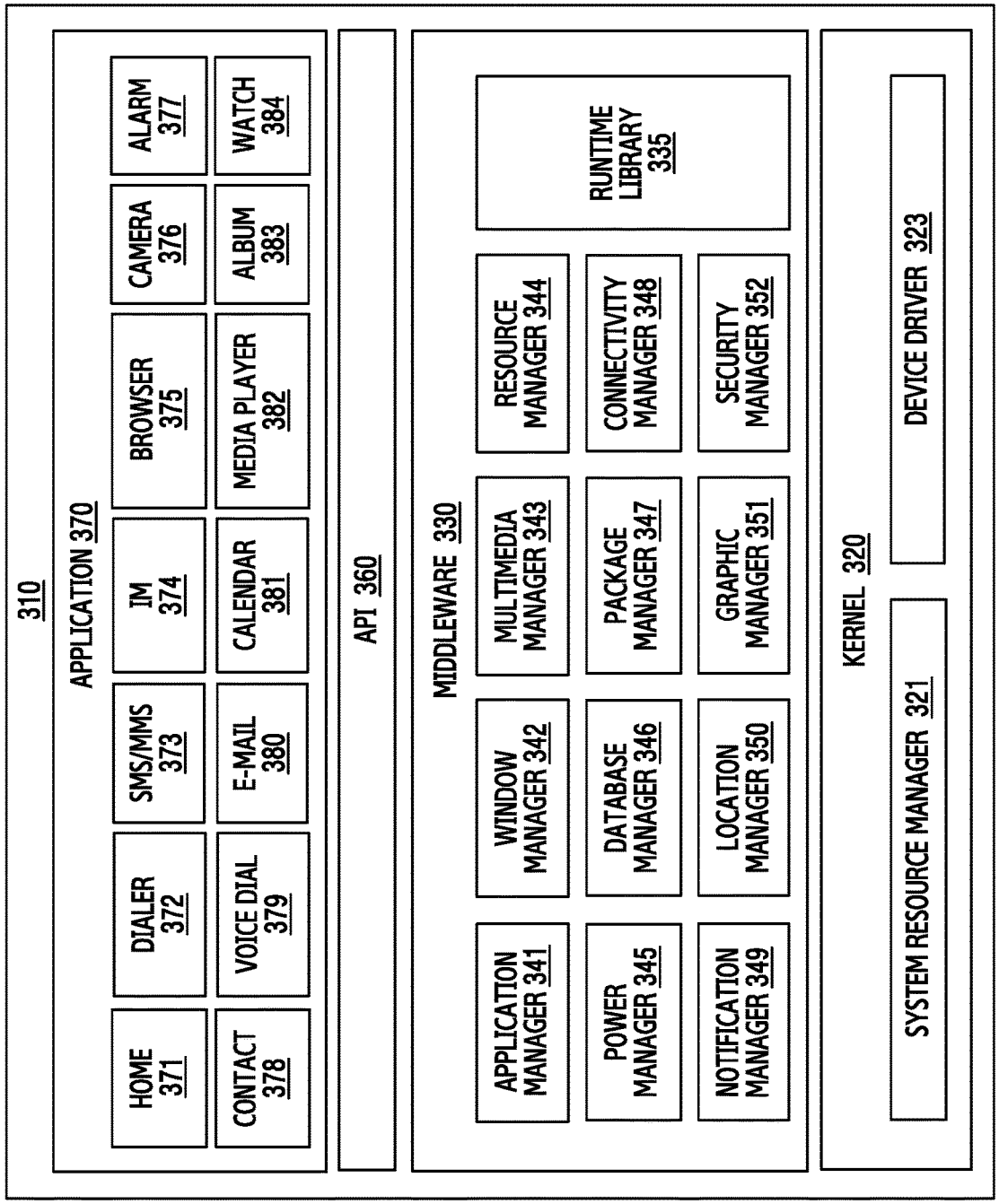
FIG. 3 is a block diagram of a program module according to various embodiments of the present disclosure.

FIG. 3 is a block diagram of a program module according to various embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function utilized by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format utilized to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information utilized for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions utilized for system security, user authentication, and the like. According to an embodiment of the present disclosure, when the electronic apparatus (e.g., the electronic device 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, watch (e.g., a clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic device 101) and an external electronic device (e.g., the electronic device 102 or 104). The application associated with information exchange may include, for example, a notification relay application for forwarding specific information to an external electronic device, or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic device (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

According to various embodiments of the present disclosure, an electronic device can include a communication module, a processor electrically coupled to the communication module, and a memory electrically coupled to the processor, such that the memory stores instructions, when executed, causing the processor to determine using the communication module whether a message is received from an external electronic device during a time preset of a registered schedule, when receiving the message, to determine whether information obtained by parsing the received message corresponds to information of the registered schedule, and when the obtained information corresponds to the registered schedule information, to determine that the registered schedule is normally fulfilled.

In an embodiment, the instructions can cause the processor to, when not receiving the message from the external electronic device during the time preset of the registered schedule, determine that the registered schedule is not normally fulfilled.

In an embodiment, the instructions can cause the processor to update status information of the registered schedule with normal execution or abnormal execution of the registered schedule.

In an embodiment, the instructions can cause the processor to display an indicator indicating that the registered schedule has been completed normally (e.g., "normally fulfilled"), an indicator indicating that the preset time (e.g., a deadline) of the registered scheduled event has not yet arrived, or an indicator indicating that the registered schedule was not completed normally (e.g., normally fulfilled), and when detecting the abnormal completion of the registered schedule, to output a notification indicating that the registered schedule was not "normally fulfilled."

In an embodiment, the instructions can cause the processor to output the notification using at least one of a preset sound, preset vibration, a preset Light Emitting Diode (LED), and a preset screen.

In an embodiment, the instructions can cause the processor to determine whether information of a user who sends the message matches preset user information of the registered schedule, when the information of the user who sends the message does not match the preset user information of the registered schedule, to determine that the obtained information does not correspond to the registered schedule information, when the information of the user who sends the message matches the preset user information of the registered schedule, to determine whether contents of the message match preset schedule details of the registered schedule, when the contents of the message do not match the preset schedule details of the registered schedule, to determine that the obtained information does not correspond to the registered schedule information, and when the contents of the message match the preset schedule details of the registered schedule, to determine that the obtained information corresponds to the registered schedule information.

In an embodiment, the instructions can cause the processor to obtain information including a user who sends the message, a reception time of the message, and details relating to the schedule in contents of the message by parsing the message, and to register the schedule by setting a time for checking whether the schedule is normally fulfilled, user information relating to the schedule, and details relating to the schedule based at least in part on the schedule information.

In an embodiment, the instructions can cause the processor to determine at least one message for schedule registration by analyzing a history of incoming messages.

In an embodiment, the instructions can cause the processor to register the schedule by further setting at least one of a message reception count for determining whether a registered schedule is normally fulfilled after the schedule is registered, and an exception period as a time interval for not determining whether the registered schedule is normally fulfilled after the schedule is registered.

Figure 4:
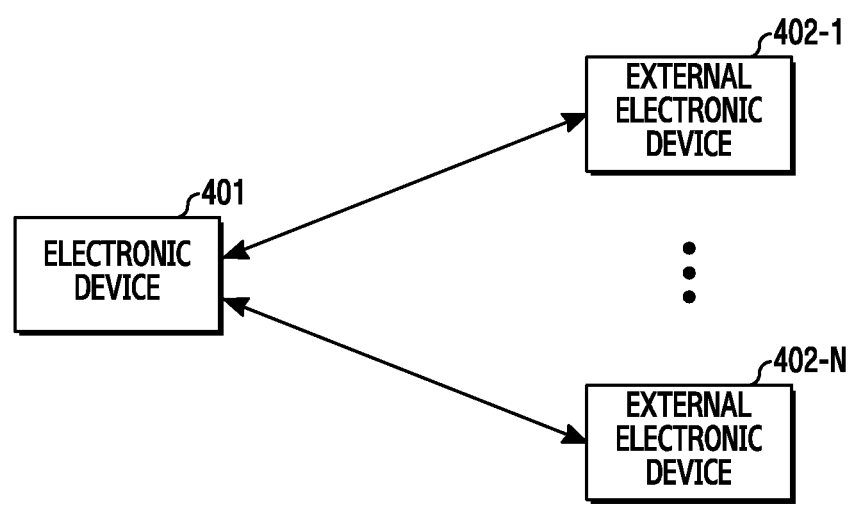
FIG. 4 is a conceptual diagram of schedule management according to an embodiment of the present disclosure.

FIG. 4 is a conceptual diagram of schedule management according to an embodiment of the present disclosure.

In an embodiment, an electronic device 401 can receive a message from at least one external electronic device 402-1 through 402-N communicatively connected, in various manners. For example, the electronic device 401 can receive a message from the at least one external electronic device 402-1 through 402-N using, but not limited to, an e-mail, a Short Messaging Service (SMS), a Multimedia Messaging Service (MMS), a Social Network Service (SNS), a community, chatting, and a messenger.

In another embodiment, the electronic device 401 can receive at least one message from at least one external electronic device 402-1 through 402-N communicatively connected. For example, the electronic device 401 can periodically (repetitively or regularly) receive a message from the external electronic device 402-1. The electronic device 401 can manage a schedule relating to, but not limited to, the message periodically received.

In an embodiment, the external electronic devices 401-1 through 402-N can be deployed in facilities such as a school, an academy, or a bank. For example, when a user of the electronic device 402-1 is a parent of a student and a child of the user is the student, the external electronic device 402-1 can be deployed in, but not limited to, a school to send a message of attendance when the student goes to school. For example, the external electronic device 402-1 can be deployed in, but not limited to, a bank to transfer a maintenance fee to an account.

In an embodiment, the electronic device 401 can register a schedule regarding the incoming message. For example, the electronic device 401 can register the schedule based at least in part on message information obtained by parsing the incoming message. In another embodiment, the electronic device 401 can register the schedule based at least in part on message information obtained by analyzing a history of incoming messages. For example, the electronic device 401 can determine messages received over a threshold count or received periodically during a preset time in the incoming message list, as messages for the schedule registration. The electronic device 401 can register the schedule based at least in part on information obtained by parsing the message for the schedule registration. In yet another embodiment, the electronic device 401 can register a schedule based on, but not limited to, at least part of a user input. The schedule registration shall be described in detail by referring to FIG. 5 through FIG. 13.

In an embodiment, when the schedule is registered, the electronic device 401 can determine (or check) whether the registered schedule is (or was) normally conducted based on, for example, at least part of a message received after the schedule registration. For example, according to a preset cycle (e.g., per day, per week, per month) of the registered schedule, when a preset time arrives (or during a preset time), the electronic device 401 can determine whether the registered schedule is normally performed.

In an embodiment, when the registered schedule is normally fulfilled, the electronic device 401 can update the registered schedule with the normal execution of the registered schedule. When the registered schedule is normally performed, the electronic device 401 can display a presentation (or indication) indicating the normal execution of the registered schedule.

In another embodiment, when the registered schedule is not normally performed, the electronic device 401 can update the registered schedule with abnormal execution of the registered schedule. When the registered schedule is not normally conducted, the electronic device 401 can display a presentation (or indication) indicating the abnormal execution of the registered schedule.

In an embodiment, the electronic device 401 can automatically determine whether, for example, a message relating to the registered schedule is received at a preset time of the registered schedule. Upon receiving the message relating to the registered schedule, the electronic device 401 can determine whether the registered schedule is normally performed based at least in part on the incoming message and provide a determination result using notification. For example, when a schedule for an academy of a student is registered with a time interval from 1:50 PM to 2:10 PM every day and a message of the student's attendance is not received or is received more than twice from the academy between 1:50 and 2:10 PM, the electronic device 401 can determine that the student does not go to school and provide a preset notification. For example, when receiving the attendance message more than twice, the academy schedule is not normally fulfilled due to an unexpected accident where, but not limited to, the attendance message is received again when the student went to the academy, left the academy due to an unexpected accidence in the academy, and went back to the academy. For example, the user can transfer money to an account in a bank or post a text (or document) to a community (e.g., a band) in the same or similar manner as or to the academy attendance. Determining whether the registered schedule is normally conducted shall be elucidated by referring to FIG. 14 through FIG. 17B.

In an embodiment, while the incoming message is explained in FIG. 4, the schedule management can be applied to an outgoing message in the same or similar manner. For example, when a schedule is registered based at least in part on the outgoing or incoming message, the electronic device 401 may determine (or check) whether the registered schedule is (or was) normally executed based at least in part on, for example, the outgoing message after the schedule management. For example, when, but not limited to, a student's schedule of attending the academy is registered, the student fails to go to the academy due to sickness, and the parent of the student sends to the academy a message regarding the registered schedule (e.g., a message notifying no attendance due to the sickness), the electronic device 401 can determine that the registered schedule is normally executed at least based on the outgoing message. In another embodiment, while the incoming message is described in FIG. 5 through FIG. 17B, the outgoing message can be applied in the same or similar manner.

Figure 5:
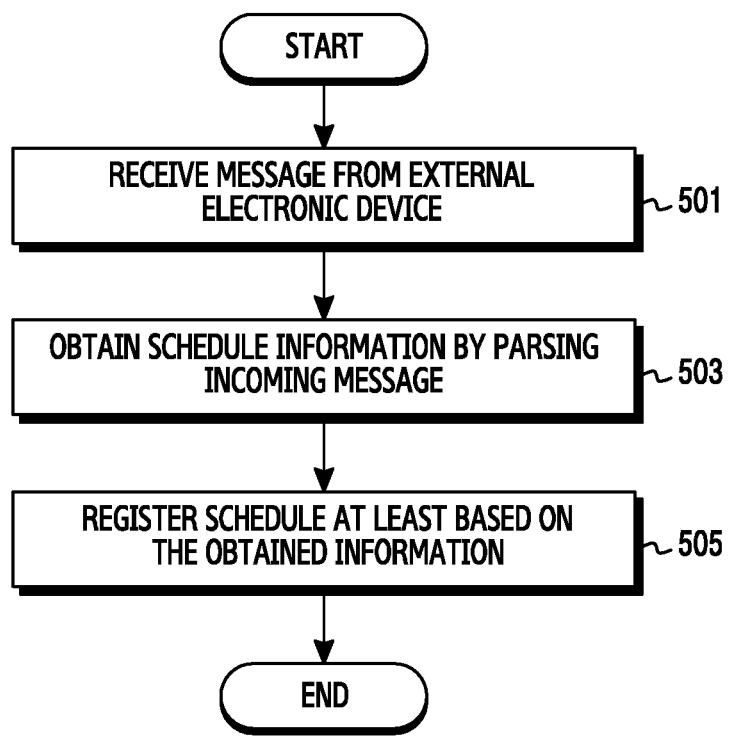
FIG. 5 is a flowchart of schedule registration according to an embodiment of the present disclosure.

FIG. 5 is a flowchart of a schedule management method according to an embodiment of the present disclosure.

Referring to FIG. 5, in operation 501, an electronic device (e.g., the processor 120) can receive a message from an external electronic device (e.g., the electronic device 102 or 104, the server 106). For example, the electronic device (e.g., the processor 120) can receive the message from the external electronic device using, but not limited to, an e-mail, an SMS, an MMS, an SNS, a community, chatting, or a messenger. While the message is received from the external electronic device in operation 501, the electronic device (e.g., the processor 120) can apply the same or similar operation to an outgoing message to the external electronic device.

In operation 503, the electronic device (e.g., the processor 120) can obtain schedule information by parsing the message received from the external electronic device (e.g., the electronic device 102 or 104, the server 106). For example, the electronic device (e.g., the processor 120) can parse the incoming message based at least in part on an input received from the user. For example, upon receiving the message, the electronic device (e.g., the processor 120) can automatically parse the incoming message. The schedule information obtained by parsing the message can include at least one of, but not limited to, information about a user (a sender or a counterpart) who sends the message, message reception time information, and schedule detail information.

In an embodiment, the electronic device (e.g., the processor 120) can obtain the information of the user who sends the message based at least in part on message transmission (or sending) information. For example, the electronic device (e.g., the processor 120) can obtain the information of the user who sends the message based on at least one of, but not limited to, a phone number, an e-mail address, an SNS ID, a community ID, a chatting ID, and a messenger ID, of the incoming the message.

In another embodiment, the electronic device (e.g., the processor 120) can obtain the information of the user who sends the message by parsing message contents. For example, the electronic device (e.g., the processor 120) can determine whether the message contents include the same (or similar) information as pre-stored user information. When the message contents include the same (or similar) information as the pre-stored user information, the electronic device (e.g., the processor 120) can obtain the same user information as the pre-stored user information, as the user information of the incoming message. For example, when the message contents include 'A English institute' stored in a contact list (e.g., a phone book list) of the electronic device (e.g., the processor 120), the electronic device (e.g., the processor 120) can obtain 'A English institute' as the user information. For example, the electronic device (e.g., the processor 120) can obtain the information of the user who sends the message based at least in part on a position and a special character in the message contents. For example, the electronic device (e.g., the processor 120) can obtain as the information of the user who sends the message, but not limited to, 13 bank' disposed between special symbols, for example, '[' and ']' at the beginning of the message contents.

In an embodiment, the electronic device (e.g., the processor 120) can obtain the message reception time information based at least in part on the message transmission information.

In an embodiment, the electronic device (e.g., the processor 120) can acquire the schedule detail information by parsing the message contents. For example, the electronic device (e.g., the processor 120) can determine whether the message contents include at least one of a preset word, a preset phrase, and a preset sentence. For example, the electronic device (e.g., the processor 120) can determine whether the message contents include a preset word regarding the schedule, such as 'to school', 'from school', 'attend', or 'transfer'. When the message contents include at least one of the preset word, the preset phrase, and the preset sentence, the electronic device (e.g., the processor 120) can obtain at least one of the preset word, the preset phrase, and the preset sentence of the message contents, as the schedule detail information.

In operation 505, the electronic device (e.g., the processor 120) can register a schedule relating to the message based at least in part on the acquired information. For example, electronic device (e.g., the processor 120) can register the message related schedule based on the acquired information, for example, based on at least one of the message sending user information, the message reception time information, and the schedule information in the message contents.

In an embodiment, based at least in part on the message sending user information, the electronic device (e.g., the processor 120) can set user (or counterpart) information of the registered schedule to send a message indicating whether the schedule is normally executed after the schedule registration. For example, the electronic device (e.g., the processor 120) can set phone number information of the user sending the message, as the user information of the registered schedule.

In an embodiment, the electronic device (e.g., the processor 120) can set multiple user information as well as the single user information. For example, when obtaining multiple user information such as phone numbers or user names (or titles) from the message, the electronic device (e.g., the processor 120) can register the obtained user information. For example, when obtaining one user information such as a phone number from the message, the electronic device (e.g., the processor 120) can register multiple user information through searching. When obtaining phone number information from the message, the electronic device (e.g., the processor 120) can search a contact list (or a phone book list) for a user contact corresponding to the phone number obtained from the incoming message. The electronic device (e.g., the processor 120) can register a user name, a user's another phone number, an e-mail address, or an ID saved in the searched user contact, as the user information together with the phone number. Notably, the present disclosure is not limited to this method for searching for another user information with one user information obtained from the message and registering the searched another user information together with the user information obtained from the message, as the user information.

In an embodiment, based at least in part on the message reception time information, the electronic device (e.g., the processor 120) can set time information of the registered schedule for determining whether the schedule is (or was) normally executed after the schedule registration. The electronic device (e.g., the processor 120) can set a time interval based on the message reception time, as the time information of the registered schedule. For example, when receiving a message at a certain time (e.g., 2:00 PM), the electronic device (e.g., the processor 120) can set, but not limited to, a time interval (e.g., 1:50 PM~2:10 PM) including a preset duration (e.g., 10 minutes) before and before the certain time, as the time information of the registered schedule. For example, the message reception time (e.g., 2:00 PM) may be set as the time information.

In an embodiment, besides the time interval, the electronic device (e.g., the processor 120) can further set a check cycle (e.g., per day, per week, or per month) for determining whether the registered schedule is normally executed (or a cycle for determining whether a message relating to the registered schedule is received) as the time information of the registered schedule. For example, the electronic device (e.g., the processor 120) can set 1:50 PM to 2:10 PM every day, as the time information of the registered schedule.

In an embodiment, the electronic device (e.g., the processor 120) can set the check cycle based on a user input. For example, the electronic device (e.g., the processor 120) can set the check cycle by receiving an input which sets the check cycle from the user.

In another embodiment, the electronic device (e.g., the processor 120) can set the check cycle on a daily basis (e.g., every day) by default.

In yet another embodiment, the electronic device (e.g., the processor 120) can set the check cycle according to the contents of the incoming message. For example, when the message includes contents relating to a daily schedule such as 'to academy' or 'to school', the electronic device (e.g., the processor 120) can set the check cycle on the daily basis. For example, when the message includes contents relating to a monthly schedule such as 'transfer' or 'installment savings', the electronic device (e.g., the processor 120) can set the check cycle on the monthly basis.

In still another embodiment, the electronic device (e.g., the processor 120) can set the check cycle according to the information of the user who sends the incoming message. For example, when the message sending user information is related to a daily schedule such as 'school' or 'academy', the electronic device (e.g., the processor 120) can set the check cycle, but not limited to, on the daily basis. For example, when the message sending user information is related to a monthly schedule such as 'bank', the electronic device (e.g., the processor 120) can set the check cycle, but not limited to, on the monthly basis.

In an embodiment, the electronic device (e.g., the processor 120) can set the schedule details based at least in part on the schedule information of the message contents. For example, the electronic device (e.g., the processor 120) can set, but not limited to, at least one of the preset word, phrase, and sentence in the message contents obtained by parsing the message in operation 503, as the schedule details of the registered schedule.

In an embodiment, after the schedule registration, the electronic device (e.g., the processor 120) can further set a message reception count of the registered schedule for determining whether the registered schedule is normally executed. For example, when the message reception count of the registered schedule is set to '1' and one message is received in the time interval of the registered schedule, the electronic device (e.g., the processor 120) can determine that the registered schedule is normally executed. For example, when the message reception count of the registered schedule is set to '1' and no message is received or two or more messages are received in the time interval of the registered schedule, the electronic device (e.g., the processor 120) can determine that the registered schedule is not normally executed (or is abnormally executed). For example, for a transfer schedule, when, but not limited to, the user transfers a maintenance fee, receives a transfer message, and receives a message of the automated maintenance fee transfer, the transfer schedule is not normally executed.

In an embodiment, the electronic device (e.g., the processor 120) can set the message reception count of the registered schedule to '1' by default. In another embodiment, the electronic device (e.g., the processor 120) can set the message reception count of the registered schedule based on, but not limited to, at least part of a user input which sets the message reception count.

In an embodiment, the electronic device (e.g., the processor 120) can further set an exception period of the registered schedule. For example, the electronic device (e.g., the processor 120) can set a time interval from July 28 to August 5 as the exception period of the registered schedule. When setting the exception period of the registered schedule, during the exception period, the electronic device (e.g., the processor 120) may not determine, but not limited to, whether the registered schedule is normally executed regardless of the incoming message relating to the registered schedule. When setting the exception period of the registered schedule, during the exception period, the electronic device (e.g., the processor 120) may not determine, but not limited to, whether the message relating to the registered schedule is received.

In an embodiment, the electronic device (e.g., the processor 120) can store the registered schedule in the memory 130.

In an embodiment, the electronic device (e.g., the processor 120) can display a screen (or a User Interface (UI)) for checking the schedule registration. For example, the electronic device (e.g., the processor 120) can display the screen showing that at least one of the user information of the registered schedule, the time information including the check cycle, the message reception count with the schedule details, and the exception period with respect to at least one schedule.

Although not depicted in FIG. 5, the electronic device (e.g., the processor 120) can manage (or display) the registered schedule in association with a calendar application. For example, the electronic device (e.g., the processor 120) can display a mark (or an indicator) of the registered schedule progress on the screen which runs the calendar application. When receiving a user input to a calendar date region corresponding to one of dates of at least one schedule, the electronic device (e.g., the processor 120) can display, but not limited to, information of the registered schedule (or the registered schedule progress) executed on the date corresponding to the date region of the received user input.

In an embodiment, although not depicted in FIG. 5, the electronic device (e.g., the processor 120) can register the schedule based at least in part on an outgoing message as well as the incoming message. For example, by parsing the outgoing message, the electronic device (e.g., the processor 120) can obtain at least one of information about a user who receives the message, time information of the message transmission, and schedule details. Based at least in part on the obtained information, the electronic device (e.g., the processor 120) can register the schedule by setting, but not limited to, the user information, the time information including the check cycle, the schedule details, or the reception count.

Figure 6B:
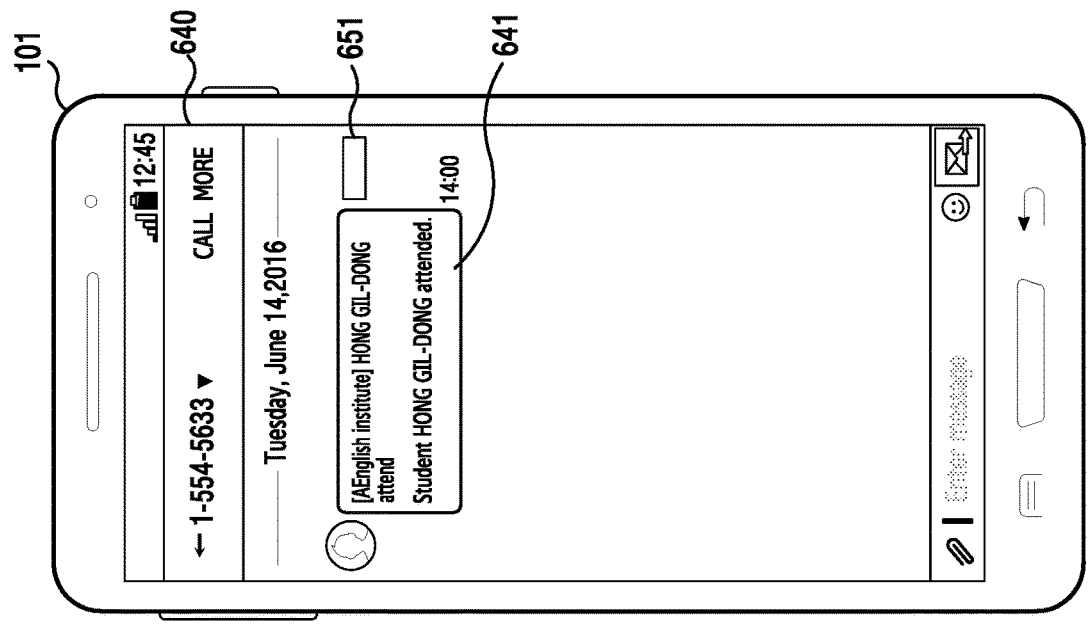
FIG. 6A and FIG. 6B are diagrams of schedule registration according to an embodiment of the present disclosure.
Figure 6A:
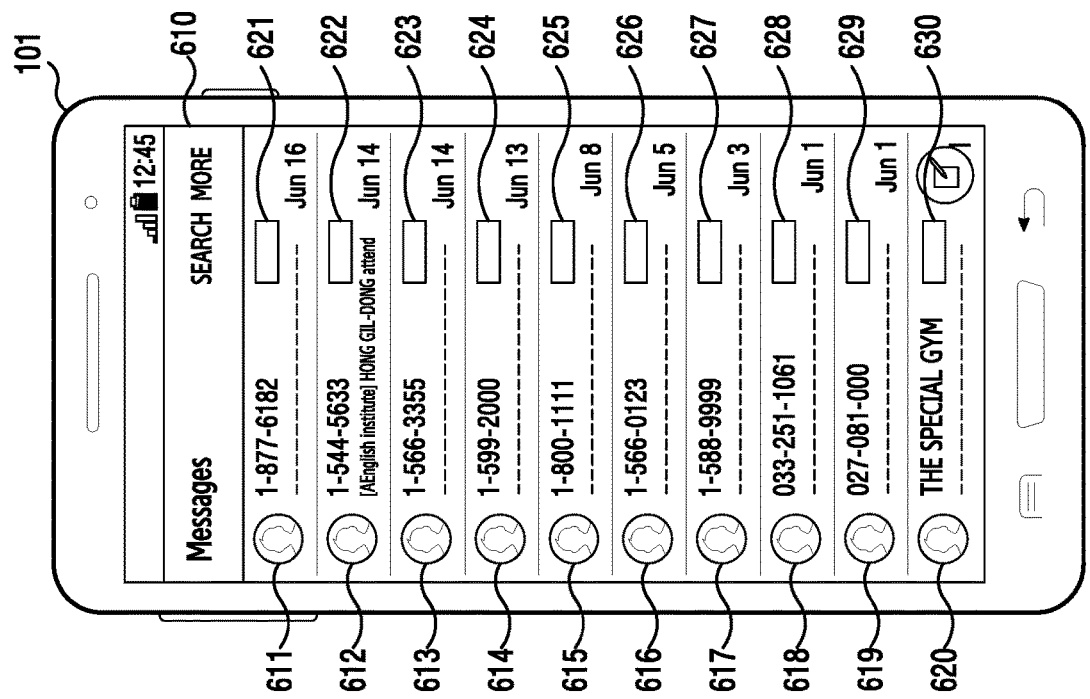

FIGS. 6A and 6B depict schedule registration according to an embodiment of the present disclosure.

FIG. 6A depicts a screen 610 displaying a log list of SMS messages (hereafter, referred to messages), and FIG. 6B depicts a screen 630 displaying detailed information of an SMS message when one SMS message of the log list is selected. While the SMS message is depicted as an example of the message in FIGS. 6A and 6B, the present disclosure is not limited to this message.

In FIG. 6A, the electronic device (e.g., the processor 120) can display a message log list including messages 611 through 620. With respect to the messages 611 through 620, the electronic device (e.g., the processor 120) can display objects (icons, items, or buttons) 621 through 630 for registering a schedule relating to the message.

In an embodiment, based at least in part on a user input which selects one of the objects 621 through 630, the electronic device (e.g., the processor 120) can register a schedule relating to the message corresponding to the selected object. For example, when the user selects the object 622 of the message 612, the electronic device (e.g., the processor 120) can register a schedule relating to the message 612. For example, the electronic device (e.g., the processor 120) can obtain at least one of message reception time information, information of a user who sends the message, and schedule detail information by parsing the message 612. For example, in FIG. 6A, the electronic device (e.g., the processor 120) can obtain at least one of time information (e.g., '2:00 PM, Jun. 14, 2016'), a phone number (e.g., '1-544-5633') of the user who sends the message, a user name (or title) (e.g., 'A English institute') sending the message, and schedule detail information (e.g., 'attend'). In an embodiment, the electronic device (e.g., the processor 120) can register the schedule based at least in part on at least one of the time information (e.g., '2:00 PM, Jun. 14, 2016') of the incoming message, the information (e.g., '1-544-5633', 'A English institute') of the user who sends the message, and the schedule detail information (e.g., 'attend').

In an embodiment, the electronic device (e.g., the processor 120) can select the object 623 of the outgoing message 613 and register the schedule relating to the outgoing message 613. For example, by parsing the outgoing message 613, the electronic device (e.g., the processor 120) can obtain at least one of, but not limited to, message transmission time information, information of a user who receives the message, and schedule detail information.

In an embodiment, as shown in FIG. 6B, the electronic device (e.g., the processor 120) can display message detail information in the outgoing message 641 and an object (an icon, an item, or a button) 651 for registering a schedule relating to the message. A screen 640 can be related to the message 612 in FIG. 6B. For example, the screen 640 of FIG. 6B can be displayed based on, but not limited to, a user input which selects the message 612.

In an embodiment, the electronic device (e.g., the processor 120) can register a schedule relating to the message 641 based at least in part on a user input to the object 651. For example, when the user touches the object 651 of the message 641, the electronic device (e.g., the processor 120) can register a schedule relating to the message 612. For example, the electronic device (e.g., the processor 120) can obtain at least one of message reception time information, the information of the user who sends the message, and the schedule detail information by parsing the message 641. For example, the electronic device (e.g., the processor 120) can obtain the time information (e.g., '2:00 PM, Jun. 14, 2016') and a phone number (e.g., '1-544-5633') of the user who sends the message. By parsing message contents '[A English institute] Hong Gil-dong attend Student Hong Gil-dong attended', the electronic device (e.g., the processor 120) can obtain the 'A English institute' information as the user name (or title) sending the message, and the 'attend' information as the schedule detail information. The electronic device (e.g., the processor 120) can register the schedule based at least in part on the time information of the incoming message, the information of the user sending the message, and the schedule detail information.

In an embodiment, while the message 641 is assumed to be the incoming message in FIG. 6B, the outgoing message 641 can be applied in the same or similar manner.

FIGS. 7A and 7B are diagrams of schedule registration according to another embodiment of the present disclosure.

FIGS. 7A and 7B depict screens 701 and 702 for registering a schedule based on information obtained from a message.

In an embodiment, in FIG. 7A, the electronic device (e.g., the processor 120) can set schedule time information 710 based on the information obtained from the message. For example, the electronic device (e.g., the processor 120) can set a time interval based on a message reception time, as the time information 710 of the registered schedule. For example, when receiving a message at 2 PM, the electronic device (e.g., the processor 120) can set, but is not limited to, the time interval (e.g., 1:50~2:10 PM) including a preset period (e.g., 10 minutes) before and after the message reception time, for use as the time information 710 of the registered schedule event. For example, the electronic device (e.g., the processor 120) may set the message reception time (e.g., 2 PM) as the time information 710. Besides the time interval that is used as the time information 710 of the registered schedule, the electronic device (e.g., the processor 120) may further set a check cycle (e.g., daily, monthly) for detecting whether the registered schedule is normally executed (or a cycle for detecting whether a message relating to the registered schedule is received). For example, the electronic device (e.g., the processor 120) can set a time interval of 1:50~2:10 every afternoon, to be used as the time information 710 of the registered schedule. The electronic device (e.g., the processor 120) can set the check cycle to be executed on a daily basis (e.g., every day) by default, or by manual configuration based at least in part on the user input. In another embodiment, the electronic device (e.g., the processor 120) can set the daily check cycle based on, but not being limited to, at least one of a message content (e.g., 'to institute') and identification information for a user who sent the message (e.g., 'A English institute'), both of which may be extracted or otherwise obtained from the message.

In an embodiment, the electronic device (e.g., the processor 120) can set user (or counterpart) information 720 of the registered schedule based at least in part on the message sending user information. For example, the electronic device (e.g., the processor 120) can set phone number information of the user who sends the message, as the user (or counterpart) information 720 of the registered schedule. In another embodiment, the electronic device (e.g., the processor 120) can set not only one user information but also multiple user information. For example, in another embodiment, the electronic device (e.g., the processor 120) can set, but not limited to, the phone number (e.g., '1-544-5633') and the user name (or title) (e.g., 'A English Institute' of the incoming message, as the user information 720.

In an embodiment, the electronic device (e.g., the processor 120) can set schedule details 730 of the registered schedule based at least in part on schedule information in the message contents. For example, the electronic device (e.g., the processor 120) can obtain, but not limited to, a preset word 'to institute' from words in the message contents acquired by parsing the message, and set the word 'institute' as the schedule details 730 of the registered schedule.

In an embodiment, after the schedule registration, the electronic device (e.g., the processor 120) can further set a message reception count 740 of the registered schedule to determine whether the registered schedule is normally executed. For example, the electronic device (e.g., the processor 120) can set the message reception count 740 of the registered schedule to '1' by default. In another embodiment, the electronic device (e.g., the processor 120) can set the message reception count 740 of the registered schedule based on, but not limited to, at least part of a user input which sets the message reception count 740.

In FIG. 7B, the electronic device (e.g., the processor 120) can further set an exception period 750 of the registered schedule. As indicated above, an exception period indicates a time interval in which the device does not detect whether the registered schedule was completed or otherwise fulfilled, after the scheduled event was registered. For example, the electronic device (e.g., the processor 120) can set a time interval 756 of 'July 28~August 5' as the exception period 750 of the registered schedule. In another embodiment, the electronic device (e.g., the processor 120) can set, but is understood as not limited to, the time interval 756 of 'July 28~August 5' as the exception period of the registered schedule, and further input explanations 755 for the exception period, such as 'summer vacation'.

In an embodiment, although not depicted in FIG. 7A and FIG. 7B, the electronic device (e.g., the processor 120) can further display an object for registering a preset schedule. For example, the electronic device (e.g., the processor 120) can register (or store) the preset schedule based at least in part on a user input for the object which registers the preset schedule. In another embodiment, when registering a schedule without a user's manual intervention (e.g., automatically), the electronic device (e.g., the processor 120) can register (or store) the scheduled event and display, but not limited to, the screen of FIG. 7A or FIG. 7B as the screen for displaying the registered scheduled event.

In an embodiment, while the schedule relating to the incoming message is registered in FIGS. 7A and 7B, the present disclosure can register a schedule relating to an outgoing message in the same or similar manner.

FIGS. 8A, 8B, and 8C are diagrams of schedule registration according to yet another embodiment of the present disclosure.

FIGS. 8A and 8B depict screens 810 and 820 displaying a registered schedule based on information obtained from a message. FIG. 8C depicts a screen 830 displaying registered schedules in association with a calendar application.

In FIG. 8A, the electronic device (e.g., the processor 120) can display a plurality of registered scheduled events (e.g., a list of registered "schedules"). For example, the electronic device may display (e.g., the processor 120 controls a display to display) the list of the registered schedules which combine user information and schedule details of the schedules, such as 'to a school', 'from a school', 'to A English institute', 'from A English institute', 'to B piano academy', 'from B piano academy', 'transfer maintenance fee', 'transfer A English institute cost', 'transfer B piano academy cost', and 'transfer installment savings'.

In FIG. 8B, together with the registered scheduled events, the electronic device (e.g., the processor 120) can display marks (e.g., visual indicators) 821, 822, and 823 indicating the progress of each registered scheduled events. For example, the electronic device (e.g., the processor 120) can display the indicator 'O' 821 indicating that the schedule 'to a school' is normally executed, the indicator 'Δ' 822 indicating that a preset time interval does not arrive in the schedule 'to A English institute', and the indicator 'x' 823 indicating that the schedule 'transfer maintenance fee' was not normally executed. The indicators indicating whether the schedule is normally executed are not limited to those depicted in FIG. 8B. For example, the electronic device (e.g., the processor 120) can indicate whether the schedule is normally executed in various ways, such as by altering a type, a shape or a color of the indicators.

In FIG. 8C, the electronic device (e.g., the processor 120) may display the screen 830 showing the progress of registered scheduled events associated with the calendar application. For example, the electronic device (e.g., the processor 120) can display the indicator 832 indicating the progress of a registered scheduled event in a region 831 including display of a current date in the calendar. The screen 830 may thus indicate the progress of the registered scheduled events associated with the calendar application which shall be described in further detail in reference to FIGS. 17A and 17B.

Figure 9:
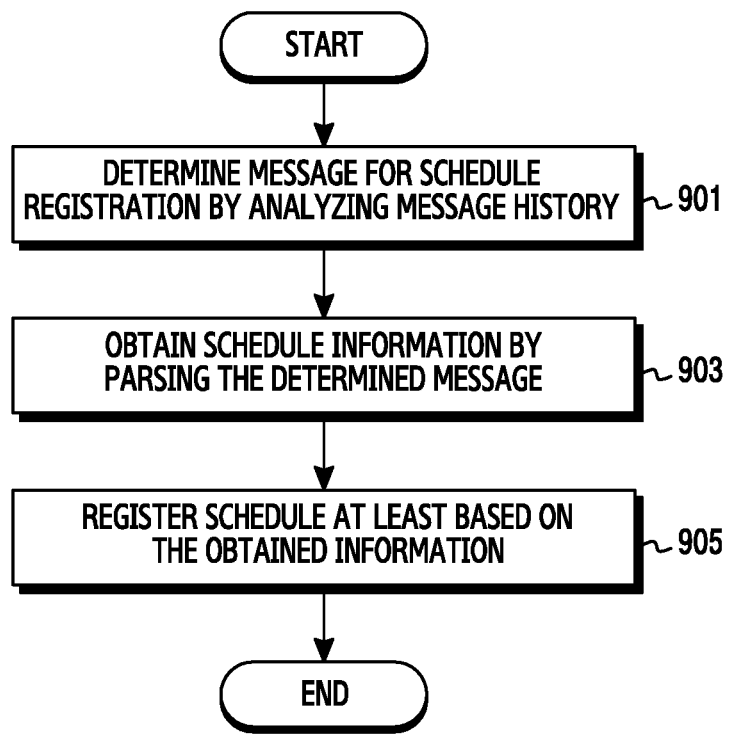
FIG. 9 is a flowchart of a schedule registration method according to another embodiment of the present disclosure.

FIG. 9 is a flowchart of a schedule registration method according to another embodiment of the present disclosure.

Referring to FIG. 9, in operation 901, the electronic device (e.g., the processor 120) can determine (or detect) a message for the schedule registration (e.g., registering an event to a schedule application) by analyzing a message history.

In an embodiment, the electronic device (e.g., the processor 120) can scan an incoming message list and determine a message received over a threshold count as the message for the schedule registration. For example, the electronic device (e.g., the processor 120) can determine a message received over six times within six months from the current time, as the message for the schedule registration.

In another embodiment, the electronic device (e.g., the processor 120) can scan the incoming message list and determine a message periodically received over a threshold count, as the message for the schedule registration. For example, the electronic device (e.g., the processor 120) can determine a message received once every day (or on a daily basis) during a week, as the message for the schedule registration. In yet another embodiment, the electronic device (e.g., the processor 120) can determine a message received once per month (or on a monthly basis) during six months, as the message for the schedule registration.

In an embodiment, the electronic device (e.g., the processor 120) can set at least one of a message reception count and a message reception cycle to determine the message for the schedule registration, based at least in part on a user input. For example, based at least in part on a user input which sets, but not limited to, the message reception count to '6' and the message reception cycle to 'monthly', the electronic device (e.g., the processor 120) can determine (or classify) a message received every day over six times among the incoming messages, as the message for the schedule registration.

In an embodiment, the electronic device (e.g., the processor 120) can determine the message for the schedule registration by considering at least one of the threshold count and the cycle among messages sent and received in one manner, for example, SMS messages. In another embodiment, the electronic device (e.g., the processor 120) can determine the message for the schedule registration by considering at least one of the threshold count and the cycle from messages sent and received in several manners, for example, SMS messages and e-mail messages. For example, when receiving, but not limited to, one SMS message and one e-mail message containing the same user information and contents (or contents relating to a schedule obtained from the SMS message) as the SMS message, the electronic device (e.g., the processor 120) can determine that the same messages are received twice.

In an embodiment, while the operation 901 scans the incoming message list and determines the message for the schedule registration by considering the threshold count or the cycle, it can include scanning the outgoing message list and determining the message for the schedule registration by considering the threshold count or the cycle. In another embodiment, the operation 901 can include scanning the incoming and outgoing message lists and determining the message for the schedule registration by considering the threshold count or the cycle. In operation 903, the electronic device (e.g., the processor 120) can obtain schedule information by parsing the determined message. In operation 905, the electronic device (e.g., the processor 120) can register the schedule based at least in part on the obtained information.

The operations 903 and 905 of FIG. 9 are substantially the same as or similar to at least part of the operations 503 and 505 of FIG. 5, and thus shall not be further explained.

Figure 10:
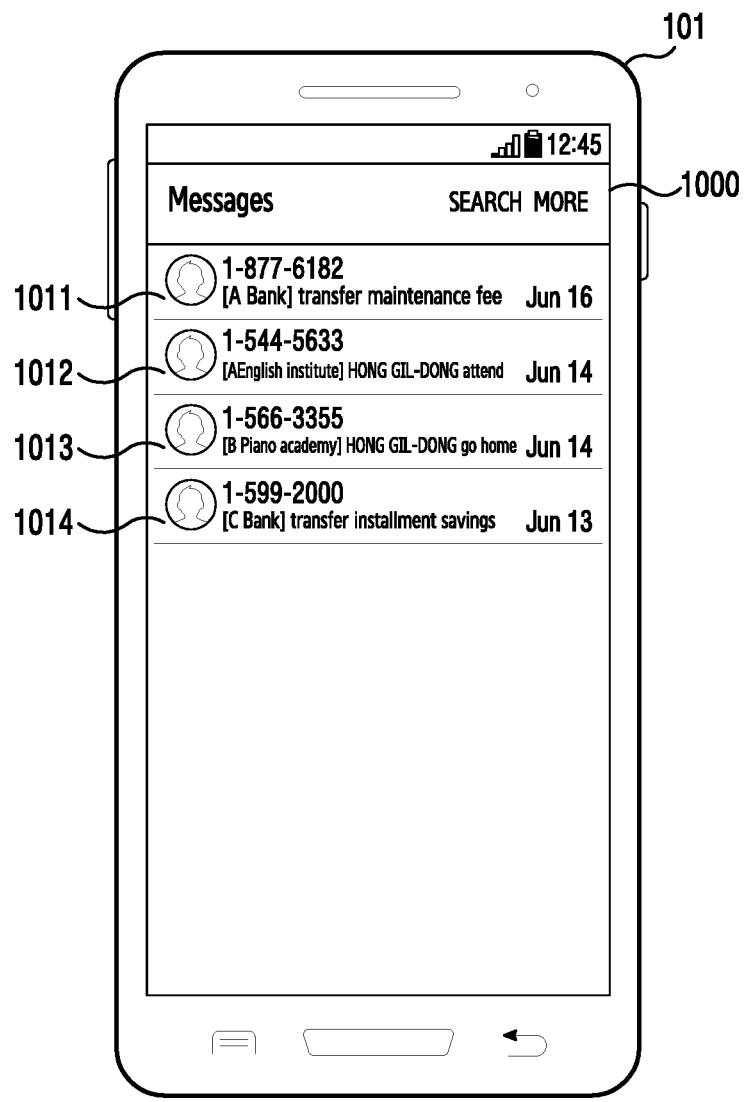
FIG. 10 is a diagram of schedule registration according to an embodiment of the present disclosure.

FIG. 10 is a diagram of schedule registration according to an embodiment of the present disclosure. For example, FIG. 10 depicts a screen 1000 displaying messages determined for schedule registration based on message history analysis.

In an embodiment, the electronic device (e.g., the processor 120) can display a list of messages 1011 through 1014 that were periodically received (or transmitted) over a threshold count through the history analysis. For example, the electronic device (e.g., the processor 120) can classify the messages 1011 through 1014 periodically received (or transmitted) over the threshold count by analyzing the history of incoming (or outgoing) messages. The electronic device (e.g., the processor 120) can display on its screen at least some of the most recently received (or transmitted) message (or a representative message) of the classified messages 1011 through 1014.

Although not depicted in FIG. 10, the same as or similar to FIG. 6A, the electronic device (e.g., the processor 120) can further display the object for the schedule registration in a region showing the determined message for the schedule registration. When displaying the object for the schedule registration, the electronic device (e.g., the processor 120) can obtain message information by parsing the determined message based at least in part on a user input for the object of the schedule registration. The electronic device (e.g., the processor 120) can register the schedule based at least in part on the obtained information.

Figure 11:
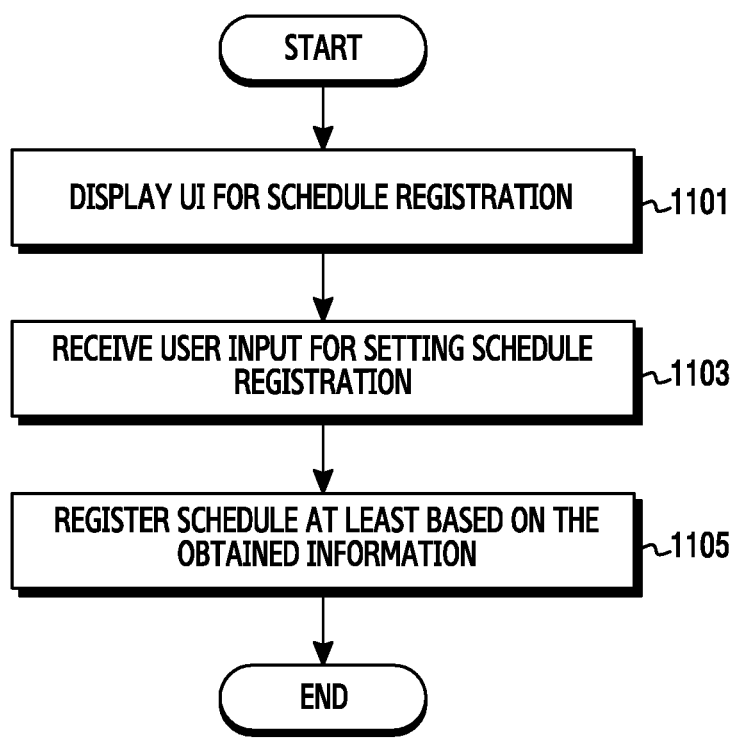
FIG. 11 is a flowchart of a schedule registration method according to yet another embodiment of the present disclosure.

FIG. 11 is a flowchart of a schedule registration method according to yet another embodiment of the present disclosure.

FIGS. 12A and 12B are a diagram of schedule registration according to an embodiment of the present disclosure.

Figure 12:
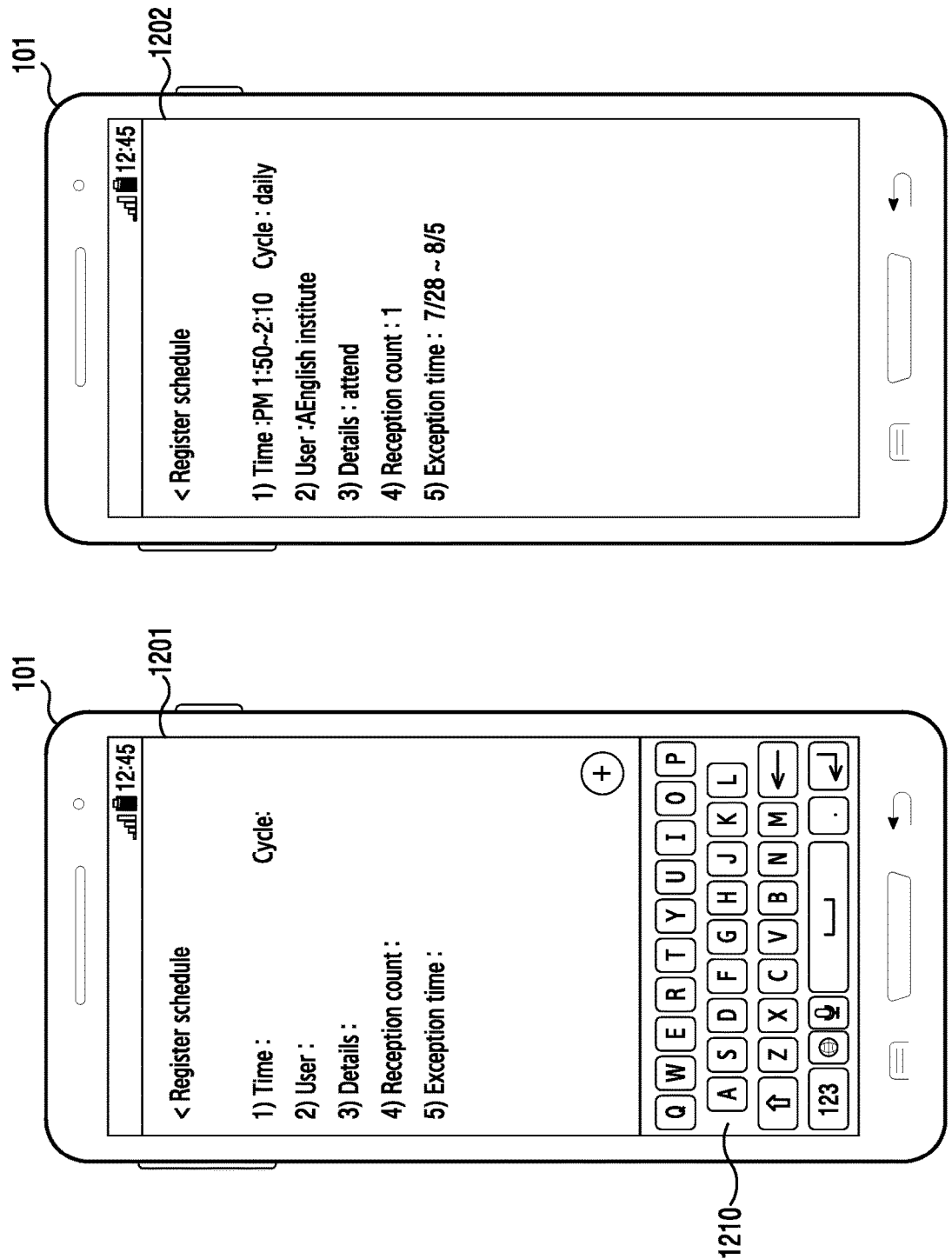
FIG. 12A and FIG. 12B are a diagram of schedule registration according to an embodiment of the present disclosure.

Referring to FIG. 11 to FIG. 12B, in operation 1101, the electronic device (e.g., the processor 120) can display a UI for schedule registration based at least in part on a user input.

In an embodiment, the electronic device (e.g., the processor 120) can display a UI (or screen) 1201 for inputting a time including options including a check cycle, a user, schedule details, a reception count, or an exception period for managing the scheduled event registration. For example, as shown in FIG. 12A, the electronic device (e.g., the processor 120) can display, but not limited to, a time input field including a check cycle input field, a user input field, a schedule details input field, a reception count input field, and/or an exception period input field. In another embodiment, the electronic device (e.g., the processor 120) can further display a keyboard (or keypad) 1210 together with the time input field including the check cycle input field, the user input field, the schedule details input field, the reception count input field, or the exception period input field.

In operation 1103, the electronic device (e.g., the processor 120) can receive a user input for setting the scheduled event registration. For example, the electronic device (e.g., the processor 120) can receive the user input for the time input field including the check cycle input field, the user input field, the schedule details input field, the reception count input field, or the exception period input field.

In an embodiment, the electronic device (e.g., the processor 120) can receive a user input which indicating the check cycle should be performed on a daily basis (e.g., every day) and a corresponding time interval for performing the check (e.g., 1:50~2:10 PM). In another embodiment, the electronic device (e.g., the processor 120) can receive a user input which enters a specific time (e.g., 2 PM) from the user.

In an embodiment, the electronic device (e.g., the processor 120) can receive a user input which enters a user name (or title) (e.g., 'A English institute'). In another embodiment, the electronic device (e.g., the processor 120) can receive a user input which enters multiple user information. For example, the electronic device (e.g., the processor 120) can receive a user input which enters at least one of, but not limited to, the name (or title), the phone number, the ID, the e-mail address of the user.

In an embodiment, the electronic device (e.g., the processor 120) may not receive a user input with respect to at least one of the check cycle and the reception count which can be set by default. In another embodiment, the electronic device (e.g., the processor 120) may not receive a user input for the exception period.

In operation 1105, the electronic device (e.g., the processor 120) can register the scheduled event based on at least one of the received user inputs.

For example, as shown in a screen 1202 of FIG. 12B, the electronic device (e.g., the processor 120) can set the time (e.g., 1:50~2:10 PM) including the cycle (e.g., daily), the user (e.g., 'A English institute'), schedule details (e.g., 'to academy'), the reception count (e.g., '1'), and the exception period (e.g., June 28~August 5), based at least part of the user input.

In an embodiment, when receiving no input for the check cycle and the reception count, the electronic device (e.g., the processor 120) can set, but is not limited to, the check cycle as 'daily' and the reception count to '1' by default, as seen in FIGS. 12A-12B In an embodiment, when receiving no user input for the exception period, the electronic device (e.g., the processor 120) can register a schedule without the exception period.

Figure 13:
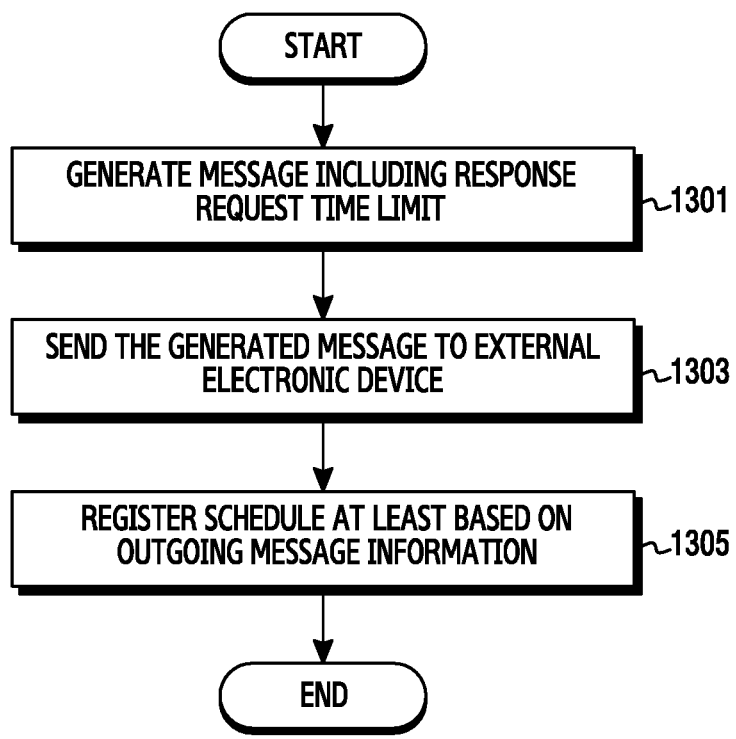
FIG. 13 is a flowchart of a schedule registration method according to still another embodiment of the present disclosure.

FIG. 13 is a flowchart of a schedule registration method according to still another embodiment of the present disclosure.

In operation 1301, the electronic device (e.g., the processor 120) can generate a message including a response request time limit (or deadline). For example, the electronic device (e.g., the processor 120) can generate an e-mail message including a time limit requesting a response from a recipient, based at least in part on a user input.

In operation 1303, the electronic device (e.g., the processor 120) can send the generated message to an external device, for example, to an external electronic device corresponding to the message recipient.

In operation 1305, the electronic device (e.g., the processor 120) can register a schedule based at least in part on information about the outgoing message. For example, the electronic device (e.g., the processor 120) can set, but not limited to, the response request time limit entered by the user as the registered schedule time, the recipient of the outgoing message as the user, and the same contents (e.g., 'to school) as pre-stored contents of the outgoing message as the schedule details.

In an embodiment, the electronic device (e.g., the processor 120) can set, but not limited to, a time interval including a period (e.g., a week) before and after the response request time limit, as the registered schedule time.

In an embodiment, the electronic device (e.g., the processor 120) can set, but not limited to, the name (or title), the e-mail address, or the ID of the message recipient, as the user.

In an embodiment, the electronic device (e.g., the processor 120) can set the schedule details based on the message contents, or based at least in part on the user input which enters schedule details.

Figure 14:
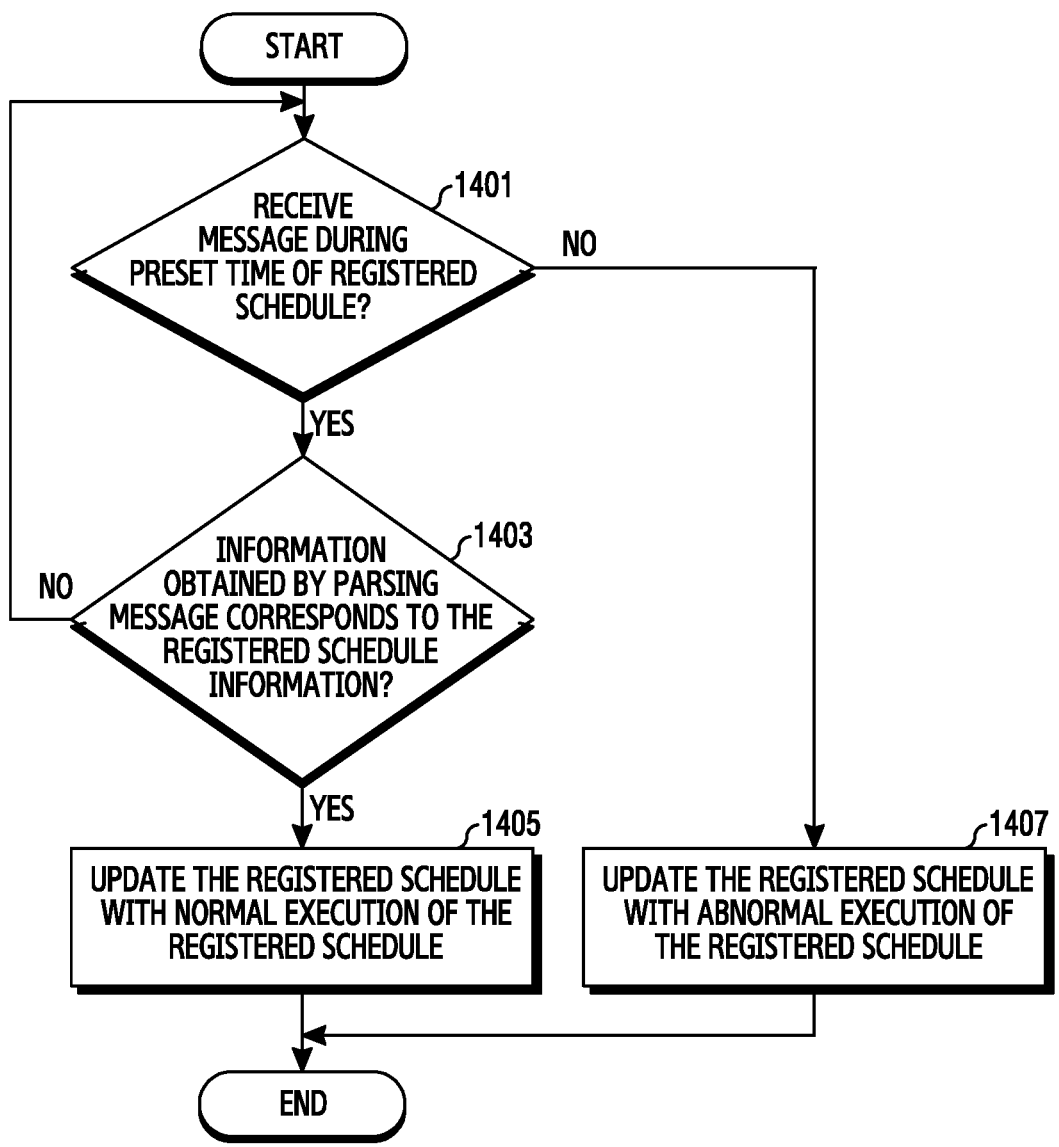
FIG. 14 is a flowchart of a schedule management method according to an embodiment of the present disclosure.

FIG. 14 is a flowchart of a schedule management method according to an embodiment of the present disclosure.

In operation 1401, the electronic device (e.g., the processor 120) can determine whether a message is received during a preset time of a registered scheduled event.

In an embodiment, the electronic device (e.g., the processor 120) can receive the message via applications such as, but not limited to, e-mail, SMS, MMS, SNS, a community facilitating application, chatting application, or a messenger application.

In an embodiment, a type (e.g., a format, and/or a message delivery method) of the incoming message may be different from the message used for the registration of events in a schedule (e.g., a schedule application application). For example, when an SMS message is indicated for registration of scheduled events, the incoming message may nonetheless be an e-mail message.

In an embodiment, the electronic device (e.g., the processor 120) can determine whether a message is received in the time interval at the check cycle of the registered schedule. For example, the electronic device (e.g., the processor 120) can determine whether a message is received in the preset time interval from 1:50 to 2:10 PM on the daily basis (or every day).

In an embodiment, when the preset time of the registered schedule corresponds to a holiday, the electronic device (e.g., the processor 120) can determine whether a message is received before and after the preset time of the registered schedule. For example, when the preset time of the registered schedule ranges from the fifth to the ninth and the eighth and the ninth are Saturday and Sunday respectively, the electronic device (e.g., the processor 120) can determine whether a message from, but not limited to, the fifth to the eleventh.

In an embodiment, when a plurality of schedules is registered, the electronic device (e.g., the processor 120) can determine whether a message is received during a preset time of each of the registered schedules. For example, when a first time is set for a first registered schedule, the electronic device (e.g., the processor 120) can determine whether a message is receive during the first time. In another embodiment, when a second time is set for a second registered schedule, the electronic device (e.g., the processor 120) can determine whether a message is receive during the second time. In an embodiment, at least some of the preset times of the registered schedules can overlap. For example, the first time (e.g., 1:50~2:10 PM) and the second time (e.g., 2:00~2:20 PM) can overlap in, but not limited to, some time interval (e.g., 2:00~2:10 PM).

In an embodiment, determining whether the message is received during the preset time of the registered schedule, for example, during the time interval in operation 1401 can further include determining whether a message is received before the preset interval of the registered schedule. For example, when the preset time of the registered schedule is set to the time interval '1:50~2:10 PM every day', the electronic device (e.g., the processor 120) can determine whether a message is received between, but not limited to, 0:00 AM and 1:50 PM on a current date.

In an embodiment, while the incoming message is explained in operation 1401, an outgoing message can be also applied in the same or similar way. For example, the electronic device (e.g., the processor 120) can determine whether, but not limited to, a message is transmitted according to a user input in the preset time interval of the registered schedule.

When receiving the message in operation 1401, the electronic device (e.g., the processor 120) may determine whether information obtained by parsing the incoming message (for example, information identifying the user sending the message, and information including the message contents) correspond to schedule information, as seen in operation 1403.

In an embodiment, the electronic device (e.g., the processor 120) can obtain the information of the user sending the message, for example, phone number information of an external electronic device which sends the message by parsing the incoming message. The electronic device (e.g., the processor 120) can determine whether the obtained phone number of the external electronic device matches user information of the registered schedule, for example, a phone number determined as the user information in the registered schedule.

In an embodiment, when the user information of the registered schedule includes a plurality of phone numbers, user names (or titles), IDs, or e-mail addresses and the information (e.g., phone number) of the user sending the message matches one of the multiple user information of the registered schedule, the electronic device (e.g., the processor 120) can determine that the user information obtained from the message corresponds to the user information of the registered schedule.

In an embodiment, the electronic device (e.g., the processor 120) can acquire the user information of the message not only from the phone number of the message but also from the message contents. For example, the electronic device (e.g., the processor 120) can acquire the user name (e.g., 'A English institute') as the user information by parsing the message contents. The electronic device (e.g., the processor 120) can compare, but not limited to, the user information obtained from the message contents with the user information of the registered schedule and thus determine whether the information acquired by parsing the message corresponds to the information of the registered schedule.

In an embodiment, when sending a message, the electronic device (e.g., the processor 120) can obtain information of a user who receives the message by parsing the outgoing message.

In an embodiment, the electronic device (e.g., the processor 120) can obtain the message contents information by parsing the incoming (or outgoing) message, and determine whether the obtained contents match the registered schedule information. For example, when, but not limited to, information 'to academy' is obtained by parsing the message contents, the electronic device (e.g., the processor 120) can determine whether the obtained message matches preset schedule information 'to academy' of the registered schedule.

In an embodiment, when the user information and the message contents obtained by parsing the message match the user information and the details of the registered schedule respectively, the electronic device (e.g., the processor 120) can determine whether the information obtained by parsing the message corresponds to the registered schedule information. For example, when the user information obtained by parsing the message does not match the user information of the registered schedule or when the message contents obtained by parsing the message does not match the details of the registered schedule, the electronic device (e.g., the processor 120) can determine that the information obtained by parsing the message does not correspond to the registered schedule information.

In an embodiment, the electronic device (e.g., the processor 120) can first determine whether the user information obtained by parsing the message matches the user information of the registered schedule. For example, the electronic device (e.g., the processor 120) can first determine whether the user information obtained by parsing the message matches the user information of the registered schedule, and when the user information obtained by parsing the message matches the user information of the registered schedule, then determine whether the message contents match the details of the registered schedule. When the user information obtained by parsing the message does not match the user information of the registered schedule, the electronic device (e.g., the processor 120) can determine that the information obtained by parsing the message does not match the details of the registered schedule, regardless of whether the message contents match the registered schedule details.

When the information obtained by parsing the message does not correspond to the registered schedule information in operation 1403, the electronic device (e.g., the processor 120) can return to operation 1401 and determine whether a message is received (or transmitted) during the preset time of the registered schedule.

When the information obtained by parsing the message corresponds to the registered schedule information in operation 1403, the electronic device (e.g., the processor 120) can determine to utilize normal execution of the registered scheduled event, and update the registered scheduled event in operation 1405. For example, when the user information and the message contents information obtained by parsing the message do indeed correspond to the user information and the details of the registered schedule, the electronic device (e.g., the processor 120) can update the registered scheduled event within the normal execution of the registered scheduled event. For example, as shown in FIG. 8B, the electronic device (e.g., the processor 120) can, but is not limited to, updating the indicator (e.g., Δ) 822 indicating that the preset time of the registered schedule does not arrive with the indicator (e.g., O) 821 indicating that the registered schedule is normally fulfilled.

When receiving (or sending) no message during the preset time of the registered schedule in operation 1401, the electronic device (e.g., the processor 120) can update the registered schedule with abnormal execution of the registered schedule in operation 1407. For example, as shown in FIG. 8B, the electronic device (e.g., the processor 120) can update, but not limited to, the indicator (e.g., Δ) 822 indicating that the preset time of the registered schedule does not arrive with the indicator (e.g., ×) 823 indicating that the registered schedule is not normally fulfilled.

Figure 15:
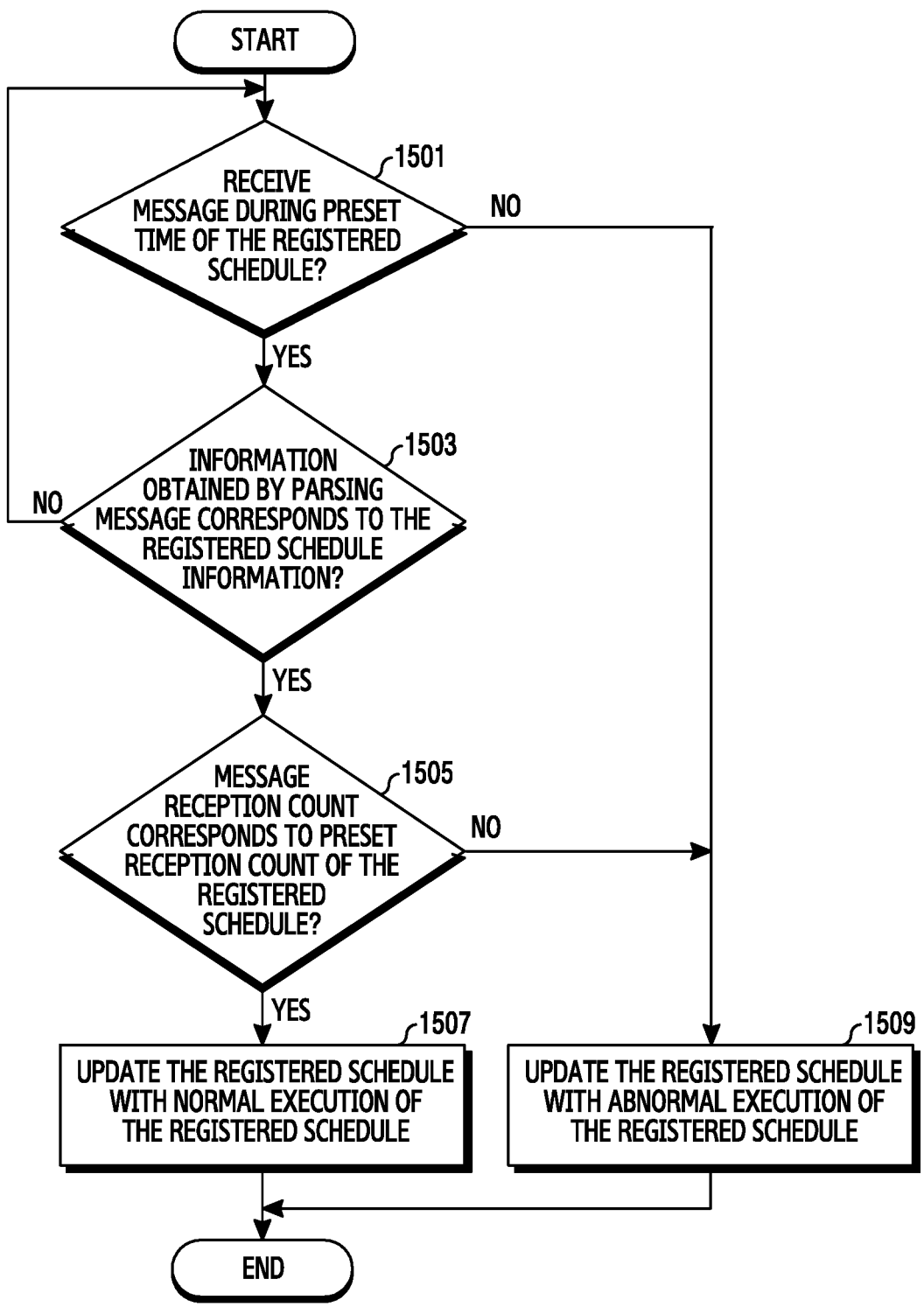
FIG. 15 is a flowchart of a schedule management method according to another embodiment of the present disclosure.

FIG. 15 is a flowchart of a schedule management method according to another embodiment of the present disclosure.

Referring to FIG. 15, operations 1501 and 1503 are substantially the same as or similar to at least part of operations 1401 and 1403 of FIG. 14, and thus shall not be further explained.

In operation 1505, the electronic device (e.g., the processor 120) can determine whether a message reception count corresponds to a preset reception count of a registered schedule. In an embodiment, the electronic device (e.g., the processor 120) can include a message transmission count in the message reception count. For example, the electronic device (e.g., the processor 120) can, but is not limited to, determining whether the message reception or transmission count corresponds to the preset reception count of the registered schedule.

In an embodiment, the electronic device (e.g., the processor 120) can determine whether the message reception count (e.g., where information obtained by parsing a message corresponds to registered schedule information in operation 1503) matches the preset reception count of the registered schedule. For example, when the preset reception count of the registered schedule is set to '1' and the message where the information obtained by parsing the message corresponds to the registered schedule information is received more than twice, the electronic device (e.g., the processor 120) can determine that the message reception count (e.g., where the information obtained by parsing the message corresponds to the registered schedule information) does not match the preset reception count of the registered schedule.

In an embodiment, when the message reception count where the information (obtained by parsing the message corresponds to the registered schedule information) does not correspond to the preset reception count of the registered schedule, the electronic device (e.g., the processor 120) can determine that the registered schedule was not normally fulfilled.

In another embodiment, when the message reception count where the information obtained by parsing the message corresponds to the registered schedule information, corresponds to the preset reception count of the registered schedule, the electronic device (e.g., the processor 120) can determine that the registered schedule is normally fulfilled.

In an embodiment, when the message reception count (e.g., where the information obtained by parsing the message corresponds to the registered schedule information) corresponds to the preset reception count of the registered schedule, the electronic device (e.g., the processor 120) can update the registered schedule to indicate the normal execution of the registered schedule in operation 1507.

In another embodiment, when the message reception count (e.g., where the information obtained by parsing the message corresponds to the registered schedule information) does not correspond to the preset reception count of the registered schedule, the electronic device (e.g., the processor 120) can update the registered schedule to indicate the abnormal execution of the registered schedule in operation 1509.

In an embodiment, operations 1507 and 1509 of FIG. 15 are the same as or similar to at least part of operations 1405 and 1407 of FIG. 14, and thus shall not be further explained.

In an embodiment, when the preset reception count of the registered schedule is '1' and a message where the information obtained by parsing the message corresponds to the registered schedule information is received twice during the preset time of the registered schedule in operation 1505, the electronic device (e.g., the processor 120) can update (or change), but not limited to, the registered schedule updated with the normal execution according to the first message reception, with the abnormal execution of the registered schedule.

Figure 16:
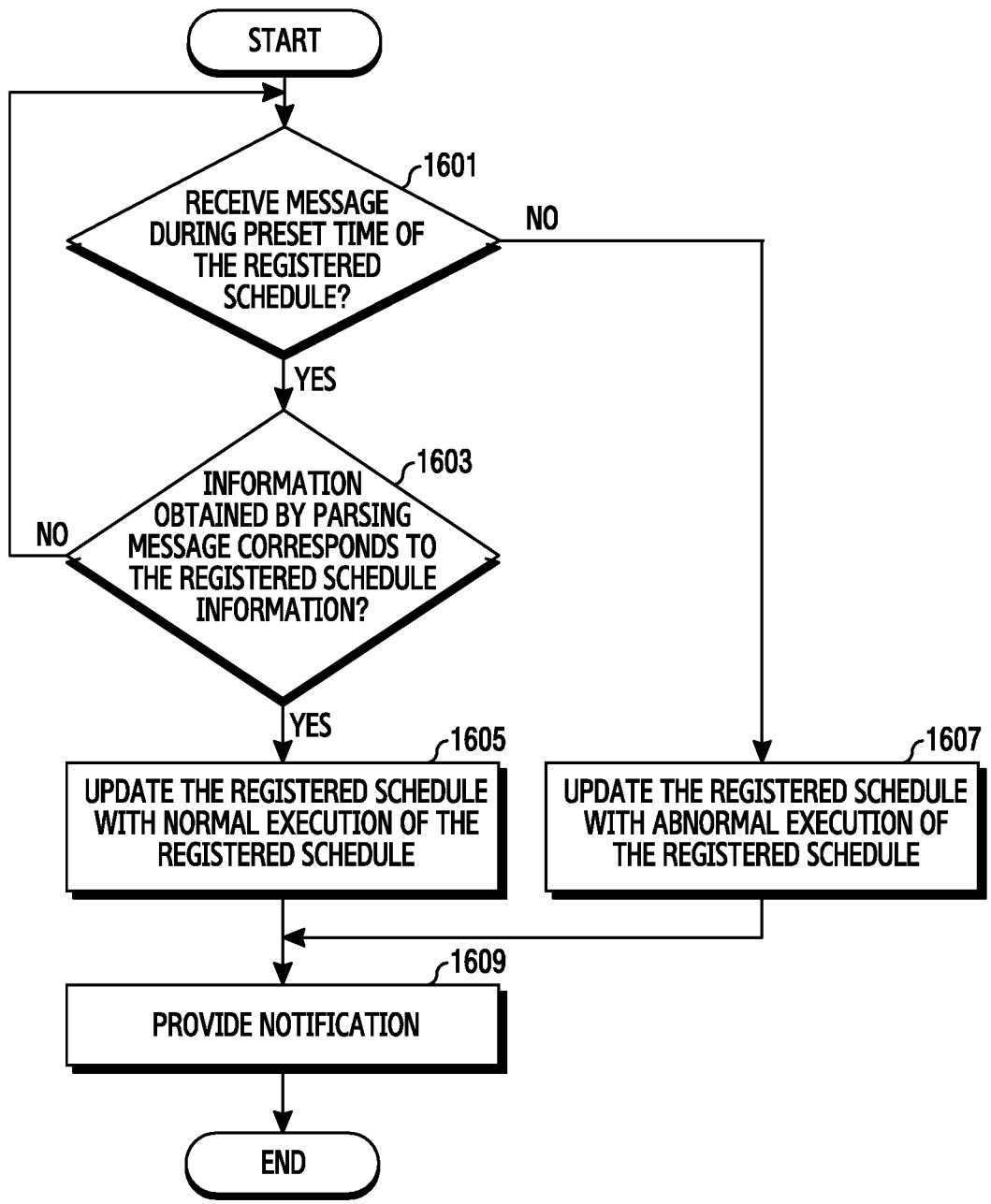
FIG. 16 is a flowchart of a schedule management method according to yet another embodiment of the present disclosure.

FIG. 16 is a flowchart of a schedule management method according to yet another embodiment of the present disclosure.

Referring to FIG. 16, operations 1601 through 1607 are the same as or similar to at least part of operations 1401 through 1407 of FIG. 14, and thus shall not be further explained.

In operation 1609, the electronic device (e.g., the processor 120) can output a notification regarding the registered schedule execution.

In an embodiment, when the registered schedule is normally fulfilled, the electronic device (e.g., the processor 120) can output the notification of the normal registered schedule execution. For example, when the registered schedule is normally fulfilled, the electronic device (e.g., the processor 120) can output at least one of a preset sound, preset vibration, a preset LED, and a preset screen. It is understood the invention is not limited to these recited examples.

In another embodiment, when the registered schedule is normally fulfilled, the electronic device (e.g., the processor 120) may not output the notification. The electronic device (e.g., the processor 120) may output the notification when the registered schedule is not normally fulfilled. For example, when the registered schedule is normally fulfilled, the electronic device (e.g., the processor 120) can delete the notification relating to the registered schedule.

In yet another embodiment, when the registered schedule is not normally fulfilled, the electronic device (e.g., the processor 120) can output a notification of abnormal registered schedule execution. For example, when the registered schedule is not normally fulfilled, the electronic device (e.g., the processor 120) can output at least one of a preset sound, preset vibration, and a preset screen. It is understood the invention is not limited to these recited examples.

In an embodiment, when receiving no message corresponding to the registered schedule of which a response request time limit is set until the response request time limit (or deadline), the electronic device (e.g., the processor 120) can output a preset notification. In another embodiment, when receiving a message corresponding to the registered schedule of which the response request time limit is set before the response request time limit (or deadline), the electronic device (e.g., the processor 120) can, but not limited to, output the message reception complete and delete the preset notification which is output when no message is received.

In an embodiment, while the notification is output due to the abnormal execution of the registered schedule, upon receiving an input which acknowledges the notification from the user of the electronic device (e.g., the processor 120), the electronic device (e.g., the processor 120) can stop the output notification.

In another embodiment, when outputting the notification of the abnormal registered schedule execution during a preset time and receiving no input which acknowledges the notification from the user of the electronic device (e.g., the processor 120), the electronic device (e.g., the processor 120) can output, but not limited to, the notification again.

Figure 17A:
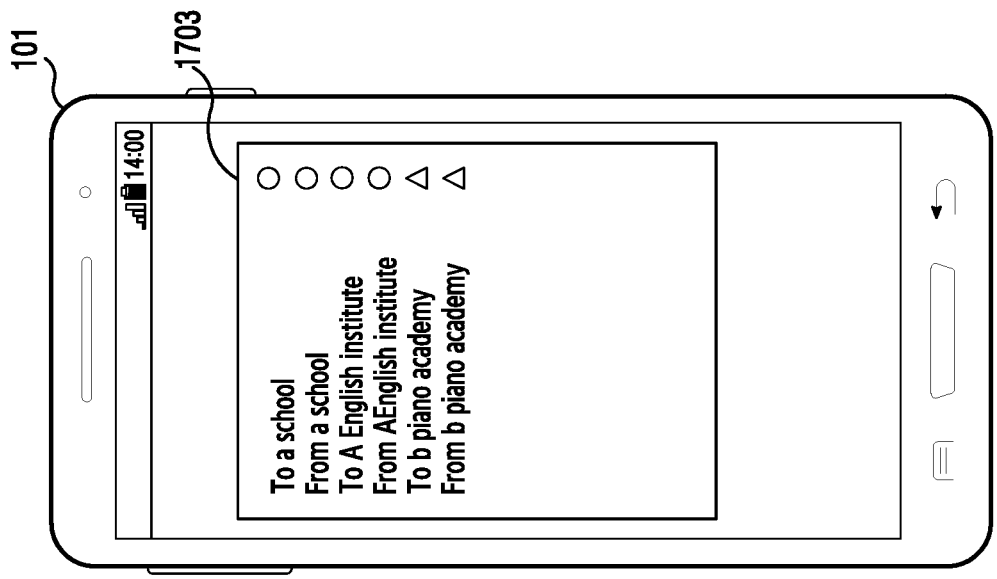
FIG. 17A and FIG. 17B are diagrams of schedule management according to an embodiment of the present disclosure.
Figure 17B:
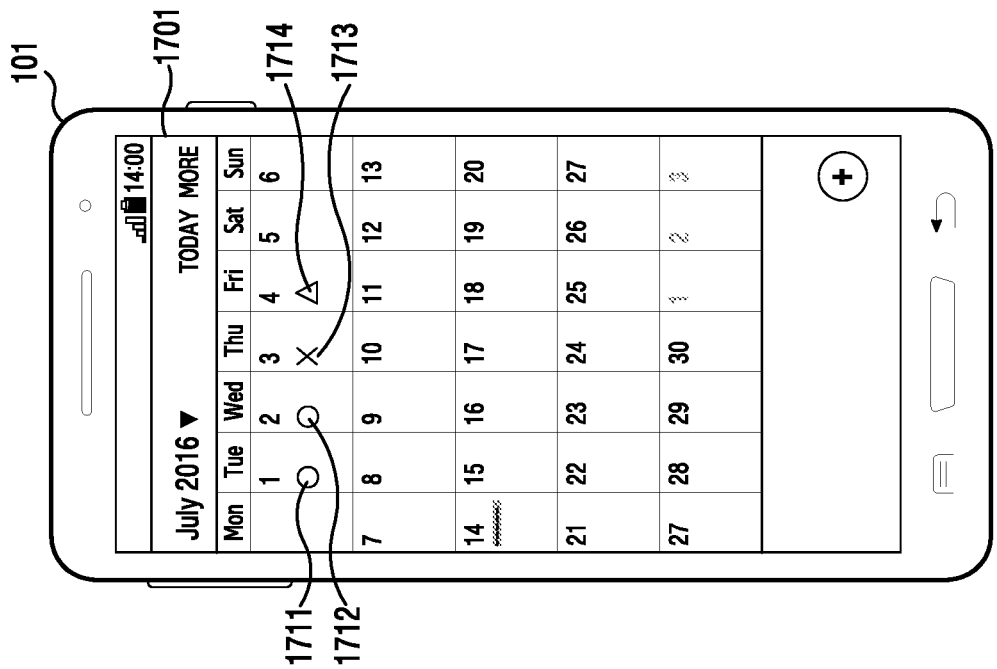

FIGS. 17A and 17B depict schedule management according to an embodiment of the present disclosure.

Assuming that a current date is "Jul. 4 2016," a screen 1701 of FIG. 17A shows the progress of registered schedules in association with a calendar application. For example, the electronic device (e.g., the processor 120) can show normal execution of schedules registered on "Jul. 1 2016" and "Jul. 2 2016" using indicators 'O' 1711 and 1712. For example, the electronic device (e.g., the processor 120) can show that at least one of scheduled events registered on "Jul. 3 2016" is not normally fulfilled (e.g., completed), using an indicators 'x' 1713. For example, when a current time is 2 PM on Jul. 4 2016, the electronic device (e.g., the processor 120) can show that a preset time interval of the registered schedules has not yet arrive, using a displayed indicator 'Δ' 1714.

In an embodiment, for at least two of a schedule normally fulfilled (e.g., completed), a schedule abnormally fulfilled (e.g., abnormally or incompletely completed), and a schedule of the preset time has not yet arrive as set for a certain time on a certain date (e.g., incomplete), the electronic device (e.g., the processor 120) can display the indicators in the calendar application based on a preset priority. For example, at 2 PM on "Jul. 4 2016," when a schedule is normally fulfilled, a preset time of another schedule has not yet arrived, and a higher priority is given to the another schedule, the electronic device (e.g., the processor 120) can display the indicator 'Δ' 1714 corresponding to the another schedule of which the preset time has not yet arrived as shown in FIG. 17A. The electronic device (e.g., the processor 120) can determine the priorities which may be disposed in an order of the abnormally executed schedule, the schedule of which the preset time does not arrive, and the normally executed schedule. For example, the priority may be determined or modified by the user setting. These are mere examples and it is understood the invention is not limited to this recited example.

In an example embodiment, a screen 1703 of FIG. 17B shows the process of registered scheduled events at, 2 PM on Jul. 4 2016. For example, based on the event indicated at "2 PM on Jul. 4 2016," the electronic device can display that (e.g., the processor 120 can control a display to display), 'to a school', 'from a school', 'to A English institute', and 'from A English institute' are normally fulfilled, and preset schedule times of 'to B piano academy' and 'from B piano academy' do not arrive. These are mere examples and it is understood the invention is not limited to this recited example.

In an example embodiment, FIG. 17B shows that the screen 1703 is displayed at least based on the user input with respect to a region corresponding to "Jul. 4 2016" on the screen, which is displayed as part of the execution of the calendar application of FIG. 17A. These are mere examples and it is understood the invention is not limited to this recited example.

The method and the electronic device for managing the schedule according to various embodiments of the present disclosure can check the incoming messages and determine whether the registered schedule is normally fulfilled (or check the progress of the registered schedule).

According to various embodiments of the present disclosure, a method can include determining whether a message is received from an external electronic device during a time preset of a registered schedule, when receiving the message, determining whether information obtained by parsing the received message corresponds to information of the registered schedule, and when the obtained information corresponds to the registered schedule information, determining that the registered schedule is normally fulfilled.

In an embodiment, the method can further include, when not receiving the message from the external electronic device during the time preset of the registered schedule, determining that the registered schedule is not normally fulfilled.

In an embodiment, the method can further include, updating the registered schedule with normal execution or abnormal execution of the registered schedule.

In an embodiment, updating the registered schedule can further include displaying an indicator indicating that the registered schedule is normally fulfilled, an indicator indicating that the preset time of the registered schedule does not arrive, or an indicator indicating that the registered schedule is not normally fulfilled, and when determining the abnormal execution of the registered schedule, outputting a notification indicating that the registered schedule is not normally fulfilled.

In an embodiment, the method can further include determining whether a message corresponding to the registered schedule is received more than twice, and when receiving the message corresponding to the registered schedule more than twice, determining that the registered schedule is not normally fulfilled.

In an embodiment, determining whether the information obtained by parsing the received message corresponds to the registered schedule information can include determining whether information of a user who sends the message matches preset user information of the registered schedule, when the information of the user who sends the message matches the preset user information of the registered schedule, determining that the obtained information does not correspond to the registered schedule information, when the information of the user who sends the message matches the preset user information of the registered schedule, determining whether contents of the message match preset schedule details of the registered schedule, when the contents of the message do not match the preset schedule details of the registered schedule, determining that the obtained information does not correspond to the registered schedule information, and when the contents of the message match the preset schedule details of the registered schedule, determining that the obtained information corresponds to the registered schedule information.

In an embodiment, the method can further include registering a schedule. Registering the schedule can include obtaining information including a user who sends the message, a reception time of the message, and details relating to the schedule in contents of the message by parsing the message, and setting a time for checking whether the schedule is normally fulfilled, user information relating to the schedule, and details relating to the schedule based at least in part on the schedule information.

In an embodiment, the method can further include determining at least one message for the schedule registration by analyzing a history of incoming messages.

In an embodiment, setting the time for checking whether the schedule is normally fulfilled, the user information relating to the schedule, and the details relating to the schedule based at least in part on the schedule information can further include setting at least one of a message reception count for determining whether a registered schedule is normally fulfilled after the schedule is registered, and an exception period as a time interval for not determining whether the registered schedule is normally fulfilled after the schedule is registered.

According to various embodiments of the present disclosure, a method can include determining an outgoing message, obtaining information about the schedule including a user who receives the outgoing message, a transmission time of the outgoing message, and details relating to the schedule in contents of the outgoing message by parsing the determined outgoing message, and, based at least in part on the schedule information, registering the schedule by setting a time for checking whether the schedule is normally fulfilled, user information relating to the schedule, and details relating to the schedule.

In an embodiment, the method can further include determining whether a message is transmitted to an external electronic device during a time preset of the registered schedule, when sending the message, determining whether information obtained by parsing the outgoing message corresponds to information of the registered schedule, and when the obtained information corresponds to the registered schedule information, determining that the registered schedule is normally fulfilled.

A data structure in embodiments of the present disclosure can be recorded on a computer-readable recording medium using various implementations. The computer-readable recording medium includes a magnetic storing medium (e.g., Read-Only Memory (ROM), floppy disc, hard disc, etc.) and an optical storage medium (e.g., Compact Disc-ROM (CD-ROM) or Digital Video Disk (DVD)).

A storage medium storing instructions can include a computer-readable storage device which records a program including the instructions which, when executed by at least one processor, makes the at least one processor to carry out at least one operations of determining whether a message is received from an external electronic device during a time preset of a registered schedule, when receiving the message, determining whether information obtained by parsing the received message corresponds to information of the registered schedule, and when the obtained information corresponds to the registered schedule information, determining that the registered schedule is normally fulfilled.

While the disclosure has been shown and described with reference to certain example embodiments thereof, it will be understood by those skilled in the art that various changes in form and details may be made therein without departing from the disclosure as defined by the appended claims and their equivalents.

What is claimed is:

1. An electronic device comprising:
a display;
a communication module;
a processor electrically coupled to the communication module; and
a memory electrically coupled to the processor and storing instructions executable to cause the processor to:
detect whether a message is received through the communication module from an external electronic device during a predesignated time of a registered event stored in a schedule application,
in response to determining that the message is received, parse the received message to detect whether information obtained by the parsing corresponds to the registered event,
based on detecting whether the obtained information corresponds to the registered event or not, identify that the registered event is completed or incomplete,
based on the identification, control the display to display at least one of a plurality of indicators indicating a status of the registered event, wherein the plurality of indicators includes a first indicator indicating the registered event is complete and a second indicator indicating the registered event is incomplete, and
in response to identifying that the registered event is incomplete, output a notification indicating that the registered event is incomplete.

2. The electronic device of claim 1, wherein the instructions are further executable to cause the processor to: in response to detecting that the message is not received, determine that the registered event is incomplete.

3. The electronic device of claim 2, wherein the instructions are further executable to cause the processor to update status information of the registered event to indicate the registered event is complete or incomplete according to whether the message is received.

4. The electronic device of claim 1, wherein the notification comprises at least one of a preset sound, a preset vibration, a preset light emitting diode (LED), or a preset display screen.

5. The electronic device of claim 2, wherein the instructions are further executable to cause the processor to:
determine whether a particular message corresponding to the registered event is received more than a predesignated threshold count, and
in response to determining that the message corresponding to the registered event is received more than the predesignated threshold count, determine that the registered event is incomplete.

6. The electronic device of claim 1, wherein the instructions are further executable to cause the processor to:
detect whether identification information a sending user who sent the received message matches preset user identification information of the registered event,
when the identification information of the sending user does not match the preset user identification information of the registered event, determine that the obtained information does not correspond to the registered event,
when the identification information of the sending user matches the preset identification user information of the registered event, detect whether at least one portion of the received message matches a preset schedule detail of the registered event,
when the at least one portion of the message does not match the preset schedule detail, determine that the obtained information does not correspond to the registered event, and
when the at least one portion of the message matches the preset schedule detail of the registered event, determine that the obtained information corresponds to the registered event.

7. The electronic device of claim 1, wherein parsing the received message comprising extracting identification of a user who sent the received message, a receival time the received message, and information related to the registered event included in a body of the received message, and
wherein the instructions are further executable to cause the processor to register a new event in the schedule application by setting a deadline for the new event to be completed, and associating both the extracted identification information and the information related to the new event.

8. The electronic device of claim 7, wherein the instructions are further executable to cause the processor to select at least one message for registration in the schedule application by analyzing a stored history of incoming messages.

9. The electronic device of claim 7, wherein
registering the new event further comprises setting at least one of:
a message reception count in which the registered new event is checked for completion when a number of messages related to the registered new event is equal to or greater than the message reception count, and
an exception period indicating a time interval in which the registered new event is not checked for completion after registration in the schedule application.

10. A method in an electronic device, comprising:
detecting, by a processor, whether a message is received through a communication module from an external electronic device during a predesignated time of a registered event stored in a schedule application;
in response to determining that the message is received, parsing the received message to detect whether information obtained by the parsing corresponds to the registered event;
based on detecting whether the obtained information corresponds to the registered event or not, identifying that the registered event is completed or incomplete;
based on the identification, controlling a display to display at least one of a plurality of indicators indicating a status of the registered event, wherein the plurality of indicators includes a first indicator indicating the registered event is complete, and a second indicator indicating the registered event is incomplete; and
in response to identifying that the registered event is incomplete, outputting a notification indicating that the registered event is incomplete.

11. The method of claim 10, further comprising:
in response to detecting that the message is not received, determining that the registered event is incomplete.

12. The method of claim 11, further comprising:
update status information of the registered event to indicate the registered event is complete or incomplete according to whether the message is received.

13. The method of claim 10, wherein the notification comprises at least one of a preset sound, a preset vibration, a preset light emitting diode (LED), or a preset display screen.

14. The method of claim 11, further comprising:
determining whether a particular message corresponding to the registered event is received more than a predesignated threshold count, and
in response to determining that the message corresponding to the registered event is received more than the predesignated threshold count, determining that the registered event is incomplete.

15. The method of claim 10, further comprising:
detecting whether identification information a sending user who sent the received message matches preset user identification information of the registered event;
when the identification information of the sending user does not match the preset user identification information of the registered event, determining that the obtained information does not correspond to the registered event;
when the identification information of the sending user matches the preset identification user information of the registered event, detecting whether at least one portion of the received message matches a preset schedule detail of the registered event;
when the at least one portion of the message does not match the preset schedule detail, determining that the obtained information does not correspond to the registered event; and
when the at least one portion of the message matches the preset schedule detail of the registered event, determining that the obtained information corresponds to the registered event.

16. The method of claim 10, wherein parsing the received message comprising extracting identification of a user who sent the received message, a receival time the received message, and information related to the registered event included in a body of the received message, and
wherein the method further comprises registering a new event in the schedule application by setting a deadline for the new event to be completed, and associating both the extracted identification information and the information related to the new event.

17. A method in an electronic device, comprising:
detecting transmission of an outgoing message;
parsing by a processor the outgoing message to retrieve at least identification information of a recipient of the outgoing message, a transmission time of the outgoing message, and event information indicated in a body of the outgoing message;
register a new event in a schedule application by setting a deadline for completion of the new event, and associating the identification information and the event information with the registered new event in the schedule application;
detecting whether a second message is transmitted during a time interval corresponding to the registered new event;
in response to determining that the second message is transmitted during the time interval, parsing the second message to detect whether any information of the second message corresponds to any information for the registered new event;
in response to detecting that the at least a portion of the information of the second message corresponds to at least a portion of the information corresponding to the registered new event, determining that the registered new event is complete;
controlling a display to display at least one of a plurality of indicators indicating a status of the registered event, the plurality of indicators including a first indicator indicating the registered event is complete, a second indicator indicating that a predesignated time for the registered event has not yet arrived, and a third indicator indicating the registered event is incomplete; and
in response to determining that the registered event is incomplete, outputting a notification indicating that the registered event is incomplete.

18. The electronic device of claim 2, wherein the plurality of indicators further includes a third indicator indicating that the predesignated time for the registered event has not yet arrived, and
wherein the instructions are further executable to cause the processor to:
control a display to display the third indicator when the predesignated time for the registered event has not yet arrived.

19. The method of claim 11, further comprising:
controlling a display to display a third indicator when the predesignated time for the registered event has not yet arrived.

* * * * *